US008435432B2

(12) United States Patent
Sasada

(10) Patent No.: US 8,435,432 B2
(45) Date of Patent: *May 7, 2013

(54) PRODUCTION METHOD FOR TRANSPARENT POLYMER FILM AND TRANSPARENT POLYMER FILM PRODUCED ACCORDING TO THE METHOD, RETARDATION FILM, POLARIZER, AND LIQUID CRYSTAL DISPLAY DEVICE

(75) Inventor: Yasuyuki Sasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1483 days.

This patent is subject to a terminal disclaimer.

(21) Appl. No.: 11/913,223

(22) PCT Filed: Feb. 21, 2007

(86) PCT No.: PCT/JP2007/053158
§ 371 (c)(1),
(2), (4) Date: Oct. 31, 2007

(87) PCT Pub. No.: WO2008/114332
PCT Pub. Date: Sep. 25, 2008

(65) Prior Publication Data
US 2009/0091694 A1    Apr. 9, 2009

(51) Int. Cl.
*G02B 1/08* (2006.01)
(52) U.S. Cl.
USPC ........ 264/235.6; 264/134; 264/1.35; 264/1.6; 264/1.7; 264/2.6; 264/172.19; 264/210.1; 264/210.5; 264/210.6; 264/211; 264/211.12; 264/235.8; 264/288.4; 264/288.8; 264/289.6
(58) Field of Classification Search ................. 264/1.34, 264/1.35, 1.6, 1.7, 2.6, 172.19, 210.1, 210.5, 264/210.6, 211, 211.12, 235.6, 235.8, 288.4, 264/288.8, 289.6
See application file for complete search history.

(56) References Cited

U.S. PATENT DOCUMENTS

| | | | | |
|---|---|---|---|---|
| 5,753,140 | A | * | 5/1998 | Shigemura ............... 252/299.01 |
| 7,955,666 | B2 | | 6/2011 | Sasada |
| 8,039,066 | B2 | | 10/2011 | Sasada |
| 8,039,067 | B2 | | 10/2011 | Sasada |
| 2002/0162483 | A1 | * | 11/2002 | Shimizu et al. .......... 106/170.28 |
| 2006/0008641 | A1 | * | 1/2006 | Kiehne et al. ................. 428/328 |
| 2006/0127607 | A1 | * | 6/2006 | Okubo et al. .................. 428/1.3 |
| 2006/0202366 | A1 | * | 9/2006 | Murakami et al. ............ 264/1.7 |
| 2006/0222786 | A1 | * | 10/2006 | Oya et al. .................... 428/1.31 |
| 2007/0275187 | A1 | * | 11/2007 | Sasada ......................... 428/1.31 |
| 2008/0003443 | A1 | | 1/2008 | Oya .............................. 428/532 |
| 2008/0118667 | A1 | * | 5/2008 | Kasahara et al. .............. 428/1.1 |
| 2011/0193260 | A1 | * | 8/2011 | Takeda et al. ................. 264/213 |

FOREIGN PATENT DOCUMENTS

| | | | |
|---|---|---|---|
| JP | 2-122915 | A | 5/1990 |
| JP | 5-157911 | A | 6/1993 |
| JP | 8-092390 | A | 4/1996 |
| JP | 2000-231016 | A | 8/2000 |
| JP | 2003-105176 | * | 4/2003 |
| JP | 2003-105176 | A | 4/2003 |
| JP | 2004-284035 | A | 10/2004 |
| JP | 2004284035 | A * | 10/2004 |
| JP | 2007-001287 | | 1/2007 |
| JP | 2007-262359 | | 10/2007 |
| JP | 2007-331387 | | 12/2007 |
| JP | 2007-332366 | | 12/2007 |
| JP | 2007-332367 | | 12/2007 |

OTHER PUBLICATIONS

Machine English translation of JP 2004-284035 A. Sep. 23, 2011.*
Office Action (Notification of Reasons for Rejection) dated Nov. 8, 2011, issued in the corresponding Japanese Patent Application No. 2007-557237, and an English Translation thereof.
Office Action issued in corresponding Chinese Patent Application No. 200780000539.5 dated Jan. 10, 2012 with English Translation.
Office Action from Korean Patent Office issued in corresponding Korean Patent Application No. 10-2007-7027945 dated May 16, 2011, with an English translation thereof.
Office Action from the State Intellectual Property Office of China issued in corresponding Chinese Patent Application No. 200780000539.5 dated Jul. 4, 2011, with an English translation.
Office Action (Notification of Reasons for Refusal) dated Aug. 9, 2011, issued in the corresponding Japanese Patent Application No. 2007-557237, and an English Translation thereof.
Form PCT/ISA/210 (International Search Report) dated May 29, 2007 (with English translation of category of cited documents).
Form PCT/ISA/237 (Written Opinion of the International Searching Authority) dated May 29, 2007.
Form PCT/ISA/206 dated Mar. 27, 2007 (with English translation of category of cited documents).
Decision on Rejection issued in corresponding Chinese Application 200780000539.5 dated Jul. 4, 2012. Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/053158, Sep. 3, 2009, The International Bureau of WIPO, Geneva, CH.

* cited by examiner

*Primary Examiner* — Christina Johnson
*Assistant Examiner* — Saeed Huda
(74) *Attorney, Agent, or Firm* — Buchanan Ingersoll & Rooney PC

(57) ABSTRACT

Retardation expressibility of a transparent polymer film can be easily controlled by heat treatment of the film at a temperature T (unit, ° C.) satisfying a condition of the following formula (1):

$$Tc \leq T < Tm_0 \qquad \text{Formula (1)}$$

wherein Tc represents the crystallization temperature (unit, ° C.) of the film before the heat treatment; and $Tm_0$ represents the melting point (unit, ° C.) of the film before the heat treatment.

19 Claims, No Drawings

PRODUCTION METHOD FOR TRANSPARENT POLYMER FILM AND TRANSPARENT POLYMER FILM PRODUCED ACCORDING TO THE METHOD, RETARDATION FILM, POLARIZER, AND LIQUID CRYSTAL DISPLAY DEVICE

TECHNICAL FIELD

The present invention relates to a method for producing a transparent polymer film. More precisely, it relates to a method for producing a transparent polymer film capable of controlling retardation. Further, the invention relates to the transparent polymer film produced according to the production method, and to a retardation film, a polarizer and a liquid crystal display device using it.

BACKGROUND ART

A polymer film of typically cellulose ester, polyester, polycarbonate, cyclo-olefin polymer, vinyl polymer or polyimide is used in silver halide photographic materials, retardation films, polarizers and image display devices. Films that are more excellent in point of the surface smoothness and the uniformity can be produced from these polymers, and the polymers are therefore widely employed for optical films. Of those, for example, cellulose ester films can be directly stuck to most popular polarizing films formed of polyvinyl alcohol (PVA)/iodine in on-line operation, because they have suitable moisture permeability. Accordingly, cellulose acylate, especially cellulose acetate is widely employed as a protective film for polarizers.

On the other hand, when a transparent polymer film is used in optical applications for retardation films, supports of retardation films, protective films of polarizers, and liquid crystal display devices, then it is an extremely important element to control the optical anisotropy of the film for determination of the performance (e.g., visibility) of display devices. With the recent requirement for broadening the viewing angle of liquid crystal display devices, it has become desired to improve retardation compensatory capability, and it is therefore desired to suitably control the in-plane retardation (Re, this may be hereinafter simply referred to as "Re") and the thickness-direction retardation (Rth, this may be hereinafter simply referred to as "Rth") of the retardation film to be disposed between a polarizing film and a liquid-crystal cell. In particular, since a transparent polymer satisfying |Rth|/Re<0.5 is not easy to produce, it is desired to develop a simple method for producing it.

On the other hand, as a production method for a polymer film, a continuous production method is disclosed, which comprises adhering a thermoshrinkable film to a polymer film, then thermally stretching it, and thereafter peeling off the thermoshrinkable film (for example, see Patent Reference 1 and Patent Reference 2). Examples in these references clarify that the polycarbonate films produced according to the method satisfy the condition of |Rth|/Re<0.5. However, the method is problematic that it consumes a large quantity of thermoshrinkable films and that the quality of the obtained films is not uniform. The problems are especially remarkable with polymers of high elasticity, such as those of cellulose ester.

Patent Reference 1: JP-A-5-157911
Patent Reference 2: JP-A-2000-231016

DISCLOSURE OF THE INVENTION

Problems that the Invention is to Solve

As in the above, a practicable method capable of controlling Re and Rth within a desired range in a simplified manner has not as yet been found out. In consideration of the prior-art problems as above, the present inventors have set an object to provide a production method for a transparent polymer film capable of controlling retardation expressibility in a relatively simplified manner.

Means for Solving the Problems

The present inventors have assiduously studied and, as a result, have found that, when a polymer film is subjected to heat treatment at a high temperature of from Tc to lower than $Tm_0$, which, in general, is not carried out even in a drying step, then the prior-art problems could be solved. Specifically, as the means for solving the problems, the invention mentioned below is provided.

[1] A method for producing a transparent polymer film, characterized by comprising heat-treating a polymer film at a temperature T (unit, ° C.) satisfying a condition of the following formula (1):

$$Tc \leq T < Tm_0 \qquad \text{Formula (1)}$$

wherein Tc represents the crystallization temperature (unit, ° C.) of the polymer film before the heat treatment; and $Tm_0$ represents the melting point (unit, ° C.) of the polymer film before the heat treatment.

[2] The method for producing a transparent polymer film of [1], wherein the film is stretched simultaneously with the heat treatment.

[3] The method for producing a transparent polymer film of [1] or [2], wherein the film is subjected to the heat treatment while transported.

[4] The method for producing a transparent polymer film of [1], wherein the film is subjected to the heat treatment while transported, and is stretched in the transport direction.

[5] The method for producing a transparent polymer film of any one of [1] to [4], wherein the film is stretched at a temperature lower than Tc after the heat treatment.

[6] The method for producing a transparent polymer film of [5], wherein the film is subjected to the heat treatment while transported, and after the heat treatment, it is stretched at a temperature lower than Tc in the direction perpendicular to the transport direction during the heat treatment.

[7] The method for producing a transparent polymer film of any one of [1] to [6], wherein the polymer film before heat treatment is stretched before the heat treatment

[8] The method for producing a transparent polymer film of [7], wherein the film is subjected to the heat treatment while stretched in the same direction as the stretching direction before the heat treatment.

[9] The method for producing a transparent polymer film of any one of [1] to [8], wherein the polymer film is contracted by from 5 to 80% during the heat treatment.

[10] The method for producing a transparent polymer film of [9], wherein the polymer film before the heat treatment is formed while transported, and it is contracted during the heat treatment in the direction perpendicular to the transport direction.

[11] The method for producing a transparent polymer film of any one of [1] to [10], wherein the film is cooled at from 100 to 1,000,000° C./min after the heat treatment.

[12] The method for producing a transparent polymer film of any one of [1] to [11], wherein the polymer is cellulose acylate.

[13] The method for producing a transparent polymer film of [12], wherein the cellulose acylate satisfies the following formula (3):

$$2.70 < SA + SB \leq 3.00 \quad \text{Formula (3)}$$

wherein SA represents a degree of substitution of the hydroxyl group of cellulose with an acetyl group; SB represents a degree of substitution of the hydroxyl group of cellulose with an acyl group having at least 3 carbon atoms.

[14] The method for producing a transparent polymer film of [12] or [13], wherein the cellulose acylate satisfies the following formula (4):

$$0 < SB \leq 3.0 \quad \text{Formula (4)}$$

wherein SB represents a degree of substitution of the hydroxyl group of cellulose with an acyl group having at least 3 carbon atoms.

[15] The method for producing a transparent polymer film of any one of [1] to [14], wherein the polymer film before the heat treatment is formed while transported, and it is stretched by from 0.1% to less than 15% in the transport direction under the condition that the residual solvent amount therein is from 5 to 1000%.

[16] The method for producing a transparent polymer film of any one of [1] to [14], wherein the polymer film before the heat treatment is formed while transported, and it is stretched by from 15 to 300% in the transport direction under the condition that the residual solvent amount therein is from 5 to 1000%.

[17] The method for producing a transparent polymer film of any one of [1] to [16], wherein the moisture permeability of the polymer film before the heat treatment, as calculated in terms of the film having a thickness of 80 μm, is at least 100 g/(m²·day).

[18] The method for producing a transparent polymer film of any one of [1] to [17], wherein the polymer film before the heat treatment contains an additive composition that increases Rth of the polymer film before the heat treatment.

[19] The method for producing a transparent polymer film of any one of [1] to [18], which is for producing a transparent polymer film satisfying the following formula (2):

$$|Rth|/Re < 0.5 \quad \text{Formula (2)}$$

wherein Re represents the retardation (unit, m) in the in-plane direction; and Rth means the retardation (unit, m) in the film-thickness direction.

[20] A method for controlling the retardation expressibility of a transparent polymer film, which comprises heat-treating a transparent polymer film at a temperature T (unit, °C.) satisfying the following formula (1)

$$Tc \leq T < Tm_0 \quad \text{Formula (1)}$$

wherein Tc represents the crystallization temperature (unit, °C.) of the polymer film before the heat treatment; and $Tm_0$ represents the melting point (unit, °C.) of the polymer film before the heat treatment.

[21] A method for producing a transparent polymer film satisfying the following formula (2), which comprises heat-treating a transparent polymer film at a temperature T (unit, °C.) satisfying a condition of the following formula (1)

$$Tc \leq T < Tm_0 \quad \text{Formula (1)}$$

wherein Tc represents the crystallization temperature (unit, °C.) of the polymer film before the heat treatment; and $Tm_0$ represents the melting point (unit, °C.) of the polymer film before the heat treatment, $$|Rth|/Re < 0.5 \quad \text{Formula (2)}$$

wherein Re represents the retardation (unit, m) in the in-plane direction; and Rth means the retardation (unit, m) in the film-thickness direction.

[22] A transparent polymer film produced by the method of any one of [1] to [21].

[23] The transparent polymer film of [22], wherein the polymer is cellulose acylate.

[24] A retardation film comprising at least one transparent polymer film of [22] or [23].

[25] A polarizer comprising at least one transparent polymer film of [22] or [23].

[26] The polarizer of [25], wherein the transparent polymer film is directly stuck to a polarizing film.

[27] A liquid crystal display device comprising at least one of the transparent polymer film of [22] or [23], the retardation film of [24], or the polarizer of [25] or [26].

Effect of the Invention

According to the production method of the invention, the retardation expressibility of a transparent film may be controlled by a relatively simple operation of heat treatment. Accordingly, a transparent film having a retardation range of |Rth|/Re<0.5, which has been heretofore difficult to produce, can be produced with ease.

BEST MODE FOR CARRYING OUT THE INVENTION

Described in detail hereinafter are the transparent polymer film and the method for producing it of the present invention. The constituent features may be described below on the basis of representative embodiments of the invention, but the invention is not limited to such embodiments. The numerical range represented by "-" herein means a range including the numerical values described before and after "-" as the lowermost value and the uppermost value, respectively.

<<Method for Producing a Transparent Polymer Film>>

[Polymer]

First, polymers that can be used in the method for producing a transparent polymer film of the invention are described.

The polymer that is the constitutive element of the transparent polymer film of the invention are polymers that can compose transparent polymer film for optical usage or the other usage like cellulose ester (for example, cellulose triacetate, cellulose acetate propionate, cellulose acetate butyrate, cellulose tripropionate, and cellulose diacetate), polyolefin (for example, polyethylene, polypropylene, norbornen polymer), polyester (for example, polymethacrylic ester, polyacrylic ester), polycarbonate, cyclo-olefin polymer, poly alylate, poly sulfone, vinyl polymer (for example, poly vinyl alcohol), polyamide, polyimide, cyclo-olefin copolymer, and poly norbornen. Preferably, the polymer has a hydrophilic structure such as a hydroxyl group, an amide group, an imido group or an ester group in the backbone chain or the side branches thereof in order to attain a suitable moisture permeability. For the polymer of the invention, copolymer or mixture of the polymers can be use. For the polymer, preferred is cellulose ester and more preferred is cellulose acylate.

The polymer may be powdery or granular, or may be pelletized.

Preferably, the water content of the polymer is at most 1.0% by mass, more preferably at most 0.7% by mass, most preferably at most 0.5% by mass. As the case may be, the water content may be preferably at most 0.2% by mass. In case where the water content of the polymer is outside the preferred range, then it is desirable that the polymer is dried by dry heating, etc. wind and before use.

One or more such polymers may be used either singly or as combined.

The cellulose ester includes cellulose ester compounds, and compounds having an ester-substituted cellulose skeleton that are obtained by biologically or chemically introducing a functional group into a starting material, cellulose. Of those, especially preferred is cellulose acylate.

Cellulose acylate is preferably used for the main component polymer of the transparent polymer film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose ester is an ester of cellulose with an acid. The acid to constitute the ester is preferably an organic acid, more preferably a carboxylic acid, even more preferably a fatty acid having 2-22 carbon atoms, most preferably a lower fatty acid having 2-4 carbon atoms.

The cellulose acylate is an ester of cellulose with a carboxylic acid. In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl or cinnamoyl, most preferably acetyl, propionyl or butyryl.

The cellulose ester may be an ester of cellulose with different acids. The cellulose acylate may be substituted with different acyl groups.

For the transparent polymer film manufactured according to the producing method of the invention, expression in Re and humidity dependency of the retardation are controlled by controlling SA and SB. The SA and SB represent a substitution degree of acetyl group (having 2 carbon atoms) which are substituted for hydroxyl group of cellulose of cellulose acylate and a substitution degree of acyl group having 3 or more carbon atoms which are substituted for hydroxyl group of cellulose, respectively. Even more, Tc is also controlled by them and the heat treatment temperature is thereby controlled. The humidity dependency of the retardation is retardation variation according to the humidity.

A value SA+SB is controlled suitably for the desired optimal property of the film of the invention, the transparent polymer film, which manufactured by the method of producing it. The SA+SB value is preferably $2.70<SA+SB \leq 3.00$, more preferably $2.88 \leq SA+SB \leq 3.00$, further preferably $2.89 \leq SA+SB \leq 2.99$, even more preferably $2.90 \leq SA+SB \leq 2.98$, particularly preferably $2.92 \leq SA+SB \leq 2.97$. When SA+SB value is increased, the Re obtained after heat treatment can be increased, the Tc can be reduced, and humidity dependency of the retardation can be improved. The heat treatment temperature can be set relatively lower when the Tc is set lower.

In addition, humidity dependency of the retardation of the transparent polymer film manufactured by the method of producing it of the invention is controlled by SB. The SB is increased, humidity dependency of the retardation of the film can be reduced, and thereby the melting point of the film is lowered. Considering the balance between the humidity dependency of the retardation of the film and the lowering of the melting point, the range of SB is preferably $0<SB \leq 3.0$, more preferably $0<SB \leq 1.0$, even more preferably $0.1 \leq SB \leq 0.7$. When all of the hydroxyl groups of the cellulose is substituted, the substituted degree is 3.

The Cellulose ester is possible to be synthesized by a known method.

Regarding a method for synthesizing cellulose acylate, its basic principle is described in *Wood Chemistry* by Nobuhiko Migita et al., pp. 180-190 (Kyoritsu Publishing, 1968). One typical method for synthesizing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to synthesize a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the carboxylic acid anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20-90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is 150-500 as the viscosity-average polymerization degree thereof, more preferably 200-400, even more preferably 220-350. The viscosity-average polymerization degree may be measured according to a description of limiting viscosity method by Uda et al. (Kazuo Uda, Hideo Saito; *Journal of the Fiber Society of Japan*, vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (polymerization degree), but its viscosity may be lower than that of ordinary cellulose acylate. Such cellulose acylate where the amount of low-molecular components is small may be obtained by removing low-molecular components from cellulose acylate synthesized in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be 0.5-25 parts by mass relative to 100 parts by mass of cellulose. When the amount of the sulfuric acid catalyst is controlled to fall within the range, then cellulose acylate having a preferable molecular weight distribution (uniform molecular weight distribution) can be synthesized. The polymerization degree and the distribution of the molecular weight of the cellulose acylate can be measured by the gel penetration chromatography (GPC), etc.

The starting material, cotton for cellulose ester and methods for synthesizing it are described also in Hatsumei Kyokai Disclosure Bulletin (No. 2001-1745, issued on Mar. 15, 2001, Hatsumei Kyokai), pp. 7-12.

[Polymer Solution]

The polymer film used for the production method of the invention (hereinafter, also referred to as "polymer film before heat treatment" in this description) may be manufactured, for example, from a polymer solution that contains the polymer and various additives, according to a method of solution casting film formation. Here in after, the polymer solution used in the method of solution casting film formation is described.

(Solvent)

The main solvent of the polymer solution (preferably, cellulose ester solution) to be used in manufacturing the polymer film used for the production method of the invention is preferably an organic solvent that is a good solvent for the polymer. The organic solvent of the type is preferably one having a boiling point of not higher than 80° C. from the viewpoint of reducing the load in drying. More preferably, the organic solvent has a boiling point of 10-80° C., even more preferably 20-60° C. As the case may be, an organic solvent having a boiling point of 30-45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the polymer solution (preferably, cellulose ester solution) to be used in manufacturing the polymer film used for the production method of the invention, when the solvent of the solution is a single solvent, then it is the main solvent, but when the solvent is a mixed solvent of different solvents, then the main solvent is the solvent having the highest mass fraction of all the constitutive solvents. Halogenohydrocarbon can be exemplified as a preferable main solvent.

The halogenohydrocarbon is preferably a chlorohydrocarbon, including dichloromethane and chloroform, and dichloromethane is more preferred.

The ester includes, for example, methyl formate, ethyl formate, methyl acetate, and ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, and 1,4-dioxane.

The alcohol includes, for example, methanol, ethanol, and 2-propanol.

The hydrocarbon includes, for example, n-pentane, cyclohexane, n-hexane, benzene, and toluene.

The organic solvent that may be combined with the main solvent includes halogenohydrocarbons, esters, ketones, ethers, alcohols and hydrocarbons, which may have a branched structure or a cyclic structure. The organic solvent may have any two or more functional groups of esters, ketones, ethers and alcohols (i.e., —O—, —CO—, —COO—, —OH). Further, hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, and pentyl acetate.

The ketone includes, for example, acetone, methyl ethyl ketone, diethyl ketone, diisobutyl ketone, cyclopentanone, cyclohexanone, and methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, and phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol. The alcohol having 1-4 carbon atoms is preferred, and methanol, ethanol or butanol is more preferred, and methanol or butanol is most preferred.

The hydrocarbon includes, for example, n-pentane, cyclohexane, n-hexane, benzene, toluene, and xylene.

The organic solvent having two or more different types of functional groups includes, for example, 2-ethoxyethyl acetate, 2-methoxyethanol, 2-butoxyethanol, and methyl acetacetate.

In case where the polymer that constitutes the transparent polymer film of the invention includes hydrogen combined functional groups such as a hydroxyl group, ester and ketone, then it is desirable that the total solvent for it contains 5%-30% by mass, more preferably 7%-25% by mass, even more preferably 10%-20% by mass of alcohol from the viewpoint of reducing the load for film peeling from a band. In the polymer containing the hydrogen combined functional group, cellulose acylate is included.

The expressibility of Re and Rth of the transparent polymer film manufactured by the production method of the invention can be easily adjusted by adjusting the content of alcohol. Specifically, a temperature of heat treatment can be relatively decreased and the achievement range of the Re and Rth can be more increased, by increasing the content of alcohol.

The polymer solution to be used for manufacturing the polymer film used for the production method of the invention is preferably so designed that the content of the organic solvent therein which has a boiling point of 95° C. or higher and is not therefore so much evaporated away along with halogenohydrocarbon in the initial drying stage but is gradually concentrated therein and is a poor solvent for cellulose ester is 1%-15% by mass, more preferably 1.5%-13% by mass, even more preferably 2%-10% by mass.

Preferred examples of the combination of organic solvents for use as the solvent in the polymer solution to be used in manufacturing the polymer film used for the production method of the invention are mentioned below, to which, however, the invention should not be limited. The numerical values for ratio are parts by mass.

(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10
(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolan/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexanone=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolan=100
(25) dichloromethane/methanol=85/15
(26) dichloromethane/methanol=92/8
(27) dichloromethane/methanol=90/10
(28) dichloromethane/methanol=87/13
(29) dichloromethane/ethanol=90/10

A detailed description of a case where a non-halogen organic solvent is the main solvent is given in Hatsumei Kyokai Disclosure Bulletin (No. 2001-1745, issued on Mar. 15, 2001, Hatsumei Kyokai), which may be conveniently referred to herein.

(Solution Concentration)

The polymer concentration in the polymer solution to be prepared is preferably 5%-40% by mass, more preferably 10%-30% by mass, most preferably 15%-30% by mass.

The polymer concentration may be so controlled that it could be a predetermined concentration in the stage where polymer is dissolved in solvent. Or, a solution having a low concentration (e.g., 4%-14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The polymer solution to be used for manufacturing the polymer film used for the production method of the invention may contain various liquid or solid additives in accordance with the application, in respective preparation steps. Examples of the additives are plasticizer (its preferred additional amount is 0.01-10% by mass of the polymer; the same shall apply hereunder), UV absorbent (0.001-1% by mass), powdery particles having a mean particle size of 5-3000 nm (0.001-1% by mass), fluorine-containing surfactant (0.001-1% by mass), release agent (0.0001-1% by mass), antioxidant (0.0001-1% by mass), optical anisotropy-controlling agent (0.01-10% by mass), IR absorbent (0.001-1% by mass).

The plasticizer and the optical anisotropy-controlling agent are organic compounds having a molecular weight of at most 3000, preferably those having both a hydrophilic part and a hydrophobic part. These compounds are aligned between the polymer chains, therefore changing the retardation of the polymer film. Combined with cellulose acylate that is especially preferably used in the invention, these compounds may improve the hydrophobicity of the film and may reduce the moisture-dependent change of the retardation thereof. When combined with the above-mentioned UV absorbent or IR absorbent, they may effectively control the wavelength dependence of the retardation of the polymer film. The additives to be used in the transparent polymer film of the invention are preferably those not substantially evaporating in the drying step.

Of the plasticizers and the optical anisotropy-controlling agents mentioned above, preferred in the invention are those plasticizers and optical anisotropy-controlling agents having an effect of increasing Rth of the polymer film before heat treatment in accordance with the intended Re and Rth. Preferably, the Rth increase range by these is from 8 to 100 nm, more preferably from 10 to 50 nm, most preferably from 15 to 30 nm. Adding such additives may selectively increase Rth of the film (unprocessed film) before processed according to the production method of the invention, and therefore, when the production method of the invention is applied to the unprocessed film of the type, then it may increase Rth/Re, and for example, a film satisfying all $Rth/Re \geq -0.39$ and $Re>0$ and $Rth<0$ can be produced.

Also preferably used herein are plasticizers and optical anisotropy-controlling agents having an effect of not so much changing Rth of the film before heat treatment or lowering it, depending on the intended Re and Rth. The Rth change range (Rth of additive-containing unprocessed film-Rth of additive-free unprocessed film) is preferably from $-100$ to less than 8 nm, more preferably from $-50$ to 5 nm, most preferably from $-30$ to 5 nm. Adding such additives may improve the mobility of the polymer molecules during heat treatment, and therefore the Re and the Rth expressibility of the transparent polymer film produced according to the production method of the invention may be further controlled, and accordingly, the heat treatment temperature may be set relatively low or the ultimate range of Re and Rth may be enlarged. Therefore, when combined with an optical anisotropy-controlling agent such as a retardation-increasing agent, not only a transparent polymer film satisfying $|Rth|/Re<0.5$ but also a transparent polymer film satisfying $|Rth|/Re \geq 0.5$ may be suitably produced.

In the invention, the Rth change range by additives may be evaluated as follows: A film is dipped in methanol at 25° C., then ultrasonically extracted for 3 hours, dried at 80° C. for 10 minutes, and its Rth ($Rth_1$) is measured. The difference between it and Rth of the film before methanol treatment ($Rth_0$), ($Rth_0-Rth_1$) indicates the Rth change range. In case where the methanol extraction is difficult for additives, the Rth change range may be evaluated by a difference ($Rth_2-Rth_3$) between Rth ($Rth_2$) of the film formed from an additive-containing dope solution before heat treatment and Rth ($Rth_3$) of the film formed from an additive-free dope solution before heat treatment.

As the additives, concretely preferred are compounds having at least one aromatic ring, more preferably from 2 to 15 aromatic rings, even more preferably from 3 to 10 aromatic rings. Preferably, the atoms except those of the aromatic ring in the compound are in a configuration near to the same plane as that of the aromatic ring; and in case where the compound has plural aromatic rings, the aromatic rings are preferably in a configuration of one and the same plane. For selectively increasing Rth, it is desirable that the additive exists in the film in such a condition that the plane of the aromatic ring thereof is in parallel to the film plane.

One or more different types of the above additives may be used herein either singly or as combined.

Concretely, the additives having an effect of increasing Rth include the plasticizers described in JP-A-2005-104148, pp. 33-34, and the optical anisotropy-controlling agents described in JP-A-2005-104148, pp. 38-89.

From the viewpoint of reducing the humidity-dependent retardation change of the film, the amount of these additives to be added to the film is preferably larger, but with the increase in the amount to be added, there may occur some problems in that the glass transition temperature (Tg) of the polymer film may lower and the additives may evaporate away during the process of film production. Accordingly, in case where cellulose acetate which is preferably used in the invention is used as the polymer, then the amount of additives having the molecular weight of 3000 or less to be added is preferably in the range of 0.01% to 30% by mass, more preferably in the range of 2% to 30% by mass, even more preferably in the range of 5% to 20% by mass relative to the polymer.

For the plasticizer or the optical anisotropy-controlling agent which can be suitably used in case that cellulose acylate is used as a polymer of the invention, specifically, there can be exemplified described in JP-A-2005-104148 and in JP-A-2001-151901. For the IR absorbent, there can be exemplified described in JP-A-2001-194522. The time of adding the additives may be properly determined depending on the types of the additives.

(Preparation of Polymer Solution)

The polymer solution may be prepared, for example, according to the methods described in JP-A-58-127737, JP-A-61-106628, JP-A2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A2000-273239. Concretely, polymer and solvent are mixed and stirred so that the mixture of polymer and the solvent is swollen, and as the case may be, this is cooled or heated so as to dissolve the mixture of polymer and the solvent, and thereafter this is filtered to obtain a polymer solution.

According to the invention, in order to improve solubility of polymer in a solvent, there may be included a process of cooling and/or heating a mixture of polymer and a solvent.

In case of cooling the mixture of polymer and a solvent in which a halogen-containing organic solvent is used as the solvent and cellulose acylate is used as a polymer, it is preferred to include a process of cooling the mixture at −100 to 10° C. Further, it is preferred to include a process of swelling the mixture at −10 to 39° C. before the process of cooling, and a process of heating the mixture at 0 to 39° C. after the process of cooling.

In case of heating the mixture of cellulose acylate and a solvent in which a halogen-containing organic solvent is used as the solvent, it is preferred to include a process of dissolving the cellulose acylate in the solvent according to at least one of the following methods (a) and (b).

(a): A mixture is swollen at −10 to 39° C., and then heated at 0 to 39° C.

(b): A mixture is swollen at −10 to 39° C., and then heated at 40 to 240° C. under pressure of 0.2 to 30 MPa. After that, the mixture is cooled at 0 to 39° C.

In addition, in case of cooling the mixture of cellulose acylate and a solvent in which a non-halogen-containing organic solvent is used as the solvent, it is preferred to include a process of cooling the mixture at −100 to −10° C. Further, it is preferred to include a process of swelling the mixture at −10 to 55° C. before the process of cooling, and a process of heating the mixture at 0 to 57° C. after the process of cooling.

In case of heating the mixture of cellulose acylate and a solvent in which a non-halogen-containing organic solvent is used as the solvent, it is preferred to include a process of dissolving the cellulose acylate in the solvent according to at least one of the following methods (c) and (d).

(c): A mixture is swollen at −10 to 55° C., and then heated at 0 to 57° C.

(d): A mixture is swollen at −10 to 55° C., and then heated at 40 to 240° C. under pressure of 0.2 to 30 MPa. After that, the mixture is cooled at 0 to 57° C.

[Film Forming Method of the Polymer Film Used for the Production Method of the Invention]

A polymer film used in the method of producing it of the invention is produced by a solution-casting film formation method with the polymer solution. The solution-casting film formation method is performed as using an ordinary solution-casting film formation apparatus, according to an ordinary solution-casting film formation method. Concretely, a dope (polymer solution) prepared in a dissolver (tank) is filtered, and then it is once stored in a storage tank in which the dope is deformed to be a final dope. The dope is kept warmed at 30° C., and fed into a pressure die from the dope take-out port, for example, via a pressure meter gear pump via which a predetermined amount of the dope may be accurately fed to the die by controlling the revolution thereof, and then the dope is then uniformly cast onto a metal support in the casting zone that runs endlessly, through the slit of the pressure die (casting step). Next, at the peeling point at which the metal support runs almost one-round, a wet dope film (this may be referred to as a web) is peeled from the metal support, and then transported to a drying zone, in which the web is dried while transported therein by rolls. The details of the casting step and the drying step of the solution-casting film formation method are described also in JP-A-2005-104148, pp. 120-146, and these may be suitably applied to the invention.

The polymer film used for the production method of the invention may be produced from a melt-casting film formation without above mentioned polymer solution. The melt-casting film formation method is a film forming method which melt polymer prepared by heated was cast onto a support and then cooled to form a film. In case where the melting point of the polymer used, or the melting point of the mixture of the polymer and various additives is lower than the decomposition temperature thereof and higher than the stretching temperature mentioned below, then the polymer film of the invention may also be formed according to a melt-casting film formation method. The melt-casting film formation method is described, for example, in JP-A-2000-352620.

In the invention, the metal support for use in forming the polymer film before heat treatment may be a metal belt or a metal drum. In case where a transparent polymer film produced by the use of a metal belt is used, Rth of the film after heat treatment may lower; and though depending on the other factors for retardation control such as the above-mentioned additives, a film having a negative Rth and satisfying |Rth|/Re<0.5 may be produced. When a transparent polymer film formed by the use of a metal drum is used, Rth of the film after heat treatment may be high; and though depending on the other factors for retardation control such as the above-mentioned additives, a film having a negative Rth near to zero or having a positive Rth and, as the case may be, satisfying |Rth|/Re<0.5 may be produced. It may be presumed that the difference in Rth after heat treatment of the polymer films for use in the production method of the invention would result from the difference in the plain alignment state of the polymer chains existing in the film before heat treatment to be caused by the difference in the external force applied to the web in the process of film formation.

For controlling the retardation of the transparent polymer film to be produced according to the production method of the invention, it is desirable to control the dynamical history to be applied to the polymer film before heat treatment, or that is, the external force to be applied to the polymer web during the process of film formation. Concretely, in case where the transparent polymer film produced according to the production method of the invention has a large Re and has a negative Rth, the polymer web is stretched preferably by from 0.1% to less than 15%, more preferably from 0.5 to 10%, even more preferably from 1 to 8%. In case where the polymer film before heat treatment is formed while transported, it is desirable that the film is stretched in the transport direction. The residual solvent amount in the polymer web during the stretching is calculated on the basis of the following formula, and is from 5 to 1000%. Preferably, the residual solvent amount is from 10 to 200%, more preferably from 30 to 150%, even more preferably from 40 to 100%.

$$\text{Residual Solvent Amount(\% by mass)} = \{(M-N)/N\} \times 100$$

wherein M represents the mass of the polymer film just before inserted into a stretching zone; N represents the mass of the polymer film just before inserted into a stretching zone and dried at 110° C. for 3 hours.

In case where the film has a large Re and a positive Rth, the polymer web is preferably stretched by from 15 to 300%, more preferably from 18 to 200%, even more preferably from 20 to 100%. In case where the polymer film before heat treatment is formed while conveyed, the film is preferably stretched in the transport direction. The residual solvent amount in the polymer web during the stretching is calculated according to the above-mentioned formula, and is from 5 to 1000%. Preferably, the residual solvent amount is from 30 to 500%, more preferably from 50 to 300%, even more preferably from 80 to 250%.

The stretching ratio (elongation) of the polymer web during the stretching may be attained by the peripheral speed difference between the metal support speed and the peeling speed (peeling off roll draw). The stretching may control the retardation expressibility.

When the web stretches with the residual solvent amount by 5% by mass or more, the haze inclined not to be increased. When the web stretches with the residual solvent amount by 1000% by mass or less, the external force applied to the polymer chain inclined to conduct easily. The effect of the retardation expressibility control by the polymer web stretching at which performed the state contained the solvent inclined to be increased. The concentration of the polymer solution, the temperature or velocity of the metal support, the temperature or wind-force of a dry wind, the solvent gas concentration in the dry atmosphere, and the like are modified, thereby properly adjusting the residual solvent amount of the polymer web.

In the process of stretching the polymer web, it is preferable that the temperature of the film surface of the web is low in the view point of applying the external force to the polymer film. It is preferable that the temperature of the web is in the range of (Ts-100) to (Ts-0.1)° C., more preferably in the range of (Ts-50) to (Ts-1)° C., and further more preferably in the range of (Ts-20) to (Ts-3)° C. Herein, Ts indicates a surface temperature of a flexible supporter. When the temperature of the flexible supporter is set to a partially different temperature, Ts indicates a surface temperature at the center portion of the supporter.

As a result, the polymer web passing the stretching process in this manner is transported to the dry zone. Then, the drying process is completed while both ends of the web are gripped by tenter clips or the web is transported to a roll group.

The residual solvent amount in the thus-dried film is preferably from 0 to 2% by mass, more preferably from 0 to 1% by mass. After dried, the film may be transported to a heat-treatment zone, or after the film is once wound up, it may be subjected to off-line heat treatment. Preferably, the polymer film before heat treatment has a width of from 0.5 to 5 m, more preferably from 0.7 to 3 m. In case where the film is once wound up, then, the preferred length of the wound film is from 300 to 30000 m, more preferably from 500 to 10000 m, even more preferably from 1000 to 7000 m.

The moisture permeability of the polymer film produced by the production method of the invention is preferably at least 100 g/(m²·day) in terms of the film having a thickness of 80 μm, more preferably from 100 to 1500 g/(m²·day), further preferably from 200 to 1000 g/(m²·day), particularly preferably from 300 to 800 g/(m²·day). For preparing the film of the invention having a moisture permeability of at least 100 g/(m²·day) in terms of the film having a thickness of 80 μm, it is desirable that the polymer hydrophilicity/hydrophobicity is suitably controlled, or the film density is lowered. For the former method, for example, the hydrophilicity/hydrophobicity of the polymer backbone chain may be suitably controlled, and hydrophobic or hydrophilic side chains may be introduced into the polymer. For the latter method, for example, side chains may be introduced into the polymer backbone chain, or the type of the solvent to be used in film formation is specifically selected, or the drying speed in film formation may be controlled.

In the invention, the moisture permeability is determined as follows: A cup with calcium chloride put therein is covered with the film to be tested and airtightly sealed up therewith, and this is left at 40° C. and 90% RH for 24 hours. From the mass change (g/(m²·day)) before and after the conditioning, the moisture permeability of the film is determined. The moisture permeability increases with the ambient temperature elevation and with the ambient humidity increase, but not depending on the condition, the relationship of the moisture permeability between different films does not change. Accordingly, in the invention, the moisture permeability is based on the mass change at 40° C. and 90% RH. In addition, the moisture permeability lowers with the increase in the film thickness and increases with the reduction in the film thickness. Accordingly, the found moisture permeability value is multiplied by the found film thickness value, and then divided by 80, and the resulting value is the "moisture permeability in terms of the film having a thickness of 80 μm" in the invention.

[Preliminary Stretching Process]

Drying the solvent, the film-formed transparent polymer film before heat treatment, which the residual solvent amount calculated according to the above-mentioned formula is less than 5%, may subject to a stretching process before a heat treatment at temperature T, which satisfies the formula $Tc \leq T < Tm_0$.

(This stretching may be hereinafter also referred to as "preliminary stretching process".) Since the preliminary stretching process is performed, it is possible to further control the expressibility of Re and Rth in the heating process. Specifically, a temperature can be relatively decreased and the achievement temperature of Re and Rth can be more increased, by decreasing the temperature of the stretching or increasing the stretching magnification within the following range. In the scope and spirit of the invention that are read out through the whole of claims and specification, other processes may be included between the preliminary stretching and the heat treatment process.

In the producing method according to the invention, the preliminary stretching process is performed at a temperature in the range of $(Tg-20)°$ C. to $(Tg+50)°$ C. when the glass transition temperature of the polymer film is defined as Tg (unit; $°$ C.). The temperature of the preliminary stretching process is preferably in the range of $(Tg-10)°$ C. to $(Tg+45)°$ C., more preferably in the range of $Tg°$ C. to $(Tg+40)°$ C., and most preferably in the range of $(Tg+5)°$ C. to $(Tg+35)°$ C. On the other hand, the temperature of the preliminary stretching process is always lower than the crystallization temperature (Tc) described later. The temperature of the preliminary stretching process is preferably $(Tc-5)°$ C. or less, more preferably $(Tc-10)°$ C. or less, further preferably $(Tc-15)°$ C. or less, even more preferably $(Tc-20)°$ C. or less, and most preferably in the range of $(Tc-35)°$ C. or less.

The glass transition temperature (Tg) of the invention defined as a boundary temperature which the mobility of the polymer comprised in the transparent polymer film is dynamically changed. The glass transition temperature of the invention was referred to the following temperature. Twenty mg of a polymer film used for the production method of the invention was put into a sample pan of Differential Scanning Calorimetory (DSC) under a current of nitrogen gas, and this was heated from 30° C. up to 120° C. at 10° C./min and maintained at 120° C. for 15 minutes, and then cooled down to 30° C. at −20° C./min and then this was again heated from 30° C. up to 250° C., and the temperature at which the base line begins to deviate from the low-temperature side was referred to the Tg of the invention.

In the manufacturing method of the invention, retardation of the film is putatively controlled by heating the polymer film of the invention above Tc or more and the structure observed in the X-ray diffraction grows. Since the film is preliminarily stretched, the polymer can be arranged to a certain degree in the preliminary stretching direction. Accordingly, the structure observed in the X-ray diffraction can efficiently and anisotropically grow in the heat treatment process to be described later. In addition, since the temperature of the preliminary drawing process is allowed to be lower than the temperature of the heat treatment process, the polymer can be oriented without the growth of the structure observed in the X-ray diffraction. Accordingly, there is an advantage that the structure observed in the X-ray diffraction can more efficiently grow in the subsequent heat treatment process. Accordingly, the stretching direction of the preliminary stretching process and the stretching direction or the conveying direction at the time of the heat treatment described later are preferably the same direction from the view point of lowering the heat treatment temperature or wide Re and Rth range obtaining. On the other hand, when they did not in the same direction, Re and Rth could be controlled in small range.

The direction of the preliminary stretching is not particularly regulated, when the polymer film before heat treatment is transported, the longitudinal stretching which the film is stretched in transport direction or the width stretching which the film is stretched in the direction perpendicular to the transport direction may be carried out. The longitudinal stretching is preferred. The method or a preferable mode for the longitudinal or width stretching can be referred to the below mentioned heat treatment column. The preliminary stretching ratio is preferably in the range of 1 to 500%, more preferably in the range of 3 to 400%, even more preferably in the range of 5 to 300%, and especially preferably in the range of 10 to 100%. The preliminary stretching may be effected in one step operation or multi-step operation. The 'preliminary stretching ratio (%)' herein means a value obtained by using the following formula.

Preliminary stretching ratio(%)=100×{(length after stretching)−(length before stretching)}/length before stretching The stretching velocity in the preliminary stretching is preferably in the range of 10 to 10000%/min, more preferably in the range of 20 to 1000%/min, and even more preferably in the range of 30 to 800%/min.

[Heat Treatment]

The method for producing a transparent polymer film of the invention is characterized by comprising a step of heat treatment of a transparent polymer film at a temperature T (unit, $°$ C.) satisfying a condition of the following formula (1). In this, the heat treatment is preferably effected while the film is transported.

$$Tc \leq T < Tm_0 \qquad \text{Formula (1)}$$

In formula (1), Tc represents the crystallization temperature of the polymer film before heat treatment, and its unit is $°$ C. In the invention, the crystallization temperature indicates a temperature at which the polymer that constitutes the transparent polymer film of the invention forms a regular periodic structure; and over the temperature, a structure to be observed in X-ray diffractiometry grows. In the invention, the crystallization temperature is determined as follows: Twenty mg of a polymer film before heat treatment is put into a sample pan of DSC, this is then heated from 30° C. up to 120° C. at 10° C./min in a nitrogen atmosphere, then kept as such for 15 minutes, and thereafter cooled to 30° C. at −20° C./min. Further, this is again heated from 30° C. up to 300° C., and the exothermic peak initiation temperature observed during this is the crystallization temperature of the film. In general, Tc appears on the higher temperature side than the above-mentioned glass transition temperature (Tg). For example, the crystallization temperature of a cellulose triacetate film having an overall degree of substitution of 2.85 may be about 190° C., though varying depending on the additive and the film formation condition; and the crystallization temperature of a cellulose triacetate film having an overall degree of substitution of 2.92 may be about 170° C.

In formula (1), $Tm_0$ represents the melting point of the polymer film before heat treatment, and its unit is $°$ C. In the invention, the melting point is determined as follows: Twenty mg of a polymer film before heat treatment is put into a sample pan of DSC, this is then heated from 30° C. up to 120° C. at 10° C./min in a nitrogen atmosphere, then kept as such for 15 minutes, and thereafter cooled to 30° C. at −20° C./min. Further, this is again heated from 30° C. up to 300° C., and the endothermic peak initiation temperature observed during this is the melting point of the film. In general, $Tm_0$ appears on the higher temperature side than the above-mentioned crystallization temperature (Tc). For example, the melting point of a cellulose triacetate film having an overall degree of substitution of 2.85 may be about 285° C., though varying depending on the additive and the film formation condition; and the melting point of a cellulose triacetate film having an overall degree of substitution of 2.92 may be about 290° C.

Heat treatment of a transparent polymer film at a temperature T satisfying the condition of formula (1) may control the retardation expressibility of the transparent polymer film. Accordingly, a transparent polymer film having a retardation value, which is heretofore not easy to produce, can be produced in a simplified manner. In particular, a transparent polymer film having |Rth|/Re<0.5, which could be heretofore produced only by a complicated production method, may be produced in a simplified manner and it may have a good face profile.

Preferably, the heat treatment temperature in the production method of the invention satisfies the following formula (1-1), more preferably the following formula (1-2), even more preferably the following formula (1-3). Selecting the temperature that satisfies the formulae is advantageous in that the Re expressibility increases and, as the case may be, the stretching direction may cross the slow axis direction at a right angle.

$$Tc \leq T < Tm_0 - 5, \quad \text{Formula (1-1)}$$

$$Tc \leq T < Tm_0 - 10, \quad \text{Formula (1-2)}$$

$$Tc + 5 \leq T < Tm_0 - 15. \quad \text{Formula (1-3)}$$

By stretching the film at the temperature T which satisfies $Tc \leq T < Tm_0$ according to the production method of the invention, the mobility of the polymer chains is improved, therefore preventing the film from whitening (that is, preventing the haze of the film from increasing) owing to the increase in the stretching ratio in film stretching and preventing the film from cutting. In addition, controlling the stretching speed and the stretching ratio in stretching in the manner mentioned hereinunder makes it possible to suitably control the balance between the aggregation and the alignment of the polymer chains and the thermal relaxation thereof that occurs simultaneously with the former. Accordingly, the production method of the invention makes it possible to highly promote the aggregation and the alignment of the polymer chains in the film, and makes it possible to produce the transparent polymer film which has an extremely large modulus of elasticity and a suitable moisture permeability and has little humidity-dependent dimensional change.

The heat treatment in the production method of the invention is preferably effected while a transparent polymer film is transported. The transporting method for a transparent polymer film is not specifically defined. Its typical examples are a method of transportation by nip rolls or a suction drum; and a method of transportation by holding with tenter clips (a method of floating transportation by air pressure). Preferred is the method of transportation by nip rolls. Concretely, this embodiment is as follows: Nip rolls are disposed at least before and after a heat treatment zone, and a polymer film is transported while led to pass between the nip rolls.

The transportation speed may be generally from 1 to 500 m/min, preferably from 5 to 300 m/min, more preferably from 10 to 200 m/min, even more preferably from 20 to 100 m/min. The transportation speed of not lower than the above-mentioned lowermost value, 1 m/min may be favorable since it may ensure industrial-scale sufficient producibility; and the speed of not higher than the above-mentioned uppermost value, 500 m/min may also be favorable since it may promote sufficient crystal growth within a practicable heat treatment zone length. A higher transportation speed may inhibit film coloration; and a lower transportation speed may shorten the heat treatment zone length. It is desirable that the transportation speed (the speed of the devices such as nip rolls and suction drum to determine the transportation speed) during heat treatment is kept constant.

The method for heat treatment in the production method of the invention includes, for example, a method of leading a transparent polymer film to pass through a zone at a temperature T while transported therethrough; a method of applying hot air to a transparent polymer film being transported; a method of irradiating a transparent polymer film being transported, with heat rays; and a method of contacting a transparent polymer film with a heated roll.

Preferred is a method of leading a transparent polymer film to pass through a zone at a temperature T while transported therethrough. The advantage of the method is that the transparent polymer film may be uniformly heated. The inside temperature of the zone may be monitored with a temperature sensor whereby the inside temperature may be kept constant at a temperature T. The transportation length of the transparent polymer film in the zone at a temperature T may vary depending on the property and the transportation speed of the transparent polymer film to be produced, and in general, it is preferably so set that the ratio of (transportation length)/(width of the transparent polymer film being transported) could be from 0.1 to 100, more preferably from 0.5 to 50, even more preferably from 1 to 20. The ratio may be abbreviated as a longitudinal/transverse ratio in this description. The traveling time through the zone at a temperature T (the time for heat treatment) may be generally from 0.01 to 60 minutes, preferably from 0.03 to 10 minutes, more preferably from 0.05 to 5 minutes. Within the range, the retardation expressibility may be excellent and the film coloration may be inhibited.

In the production method of the invention, the film may be stretched simultaneously with heat treatment. The stretching direction during heat treatment is not specifically defined. In case where the polymer film before heat treatment has anisotropy, it is desirable that the polymer film is stretched in the polymer alignment direction in the polymer film before heat treatment. The film having anisotropy as referred to herein means that the ratio of the sound wave velocity in the direction in which the sound wave velocity is the maximum to the sound wave velocity in the direction perpendicular to that direction is preferably from 1.01 to 10.0, more preferably from 1.1 to 5.0, even more preferably from 1.2 to 2.5. The sound wave velocity in the direction in which the sound wave velocity is the maximum, and in other directions may be determined as follows: The film is conditioned at 25° C. and a relative humidity of 60% for 24 hours, then using an alignment analyzer (SST-2500, by Nomura Shoji), the sound wave velocity through the film in the direction in which the longitudinal vibration velocity of an ultrasonic pulse through it is the maximum, and in other directions may be determined.

For example, in case where a transparent polymer film is subjected to heat treatment while transported by the use of a device having a heating zone between two nip rolls, the rotation speed of the nip roll on the outlet side of the heating zone is made higher than the rotation speed of the nip roll on the inlet side of the heating zone, whereby the transparent polymer film may be stretched in the transport direction (machine direction). Apart from it, the transparent polymer film may be held by tenter clips on its both sides, and it may be led to pass through the heating zone while expanded in the direction perpendicular to the transport direction (cross direction), and may be thus stretched. Stretching the transparent polymer film in the transport direction during heat treatment makes it possible to further control the retardation expressibility of the film. The stretching ratio in the transport direction may be generally from 0.8 to 100 times, preferably from 1.0 to 10 times, more preferably from 1.2 to 5 times. Stretching the transparent polymer film in the direction perpendicular to the transport direction during heat treatment improves the surface profile of the transparent polymer film after heat treatment. The stretching ratio in the direction perpendicular to the transport direction may be generally from 0.8 to 10 times, preferably from 1.0 to 5 times, more preferably from 1.1 to 3 times. The stretching ratio (%) as referred to herein means a value obtained according to the following formula:

Stretching Ratio(%)=100×{(length after stretching)−(length before stretching)}/length before stretching.

Preferably, the stretching speed in the stretching is from 10 to 10000%/min, more preferably from 20 to 1000%/min, even more preferably from 30 to 800%/min.

During heat treatment, the transparent polymer film may be contracted. The contraction is preferably effected during heat treatment. Contracting the transparent polymer film during heat treatment makes it possible to control the optical properties and/or the mechanical properties. The process of contracting in the width direction may be effected not only during heat treatment but also before and after the process of heat treatment. The process of contracting in the width direction may be effected in one stage, or the contracting process and the stretching process may be carried out repeatedly.

In case where the film is contracted, the contraction ratio is preferably from 5 to 80%, more preferably from 10 to 70%, even more preferably from 20 to 60%, most preferably from 25 to 50%. The contraction direction is not specifically defined. In case where the polymer film before heat treatment is formed while transported, the film is preferably contracted in the direction perpendicular to the transport direction. In case where the film is stretched (pre-stretched) before contraction, the film is preferably contracted in the direction perpendicular to the stretching direction. The contraction ratio may be controlled by changing the heat treatment temperature or by changing the external force to be applied to the film. Concretely, in case where the sides of the film are held with tenter clips, the rail expansion ratio may be varied for the control. In case where the sides of the film are not held but the film is held only by a device to fix the film in the transport direction, for example, by nip rolls, the distance between the tools of fixing the film in the transport direction may be changed, or the film to be applied to the film may be changed, or the heat quantity to be given to the film may be changed for the control. The contraction ratio in the width direction may be obtained according to the following formula, after measuring the overall width just before and after contraction.

Contraction Ratio in width direction(%)=100×(overall width just before contraction−overall width just after contraction)/overall width just before contraction.

The process of heat treatment of the transparent polymer film at a temperature T may be attained only once in the production method of the invention, or may be effected plural times. The multiple heat treatment means that the film is once cooled to a temperature lower than Tc after the previous heat treatment, and then it is again subjected to heat treatment while transported and set at a temperature of from Tc to lower than $Tm_0$. In the multiple heat treatment, it is desirable that the film satisfies the above-mentioned stretching ratio after the stage of completion of all heat treatments. In the production method of the invention, the heat treatment is effected at most 3 times, more preferably at most 2 times, most preferably once.

[Cooling after Heat Treatment]

The polymer film after the heat treatment is cooled to a temperature lower than Tc. The cooling temperature is not specifically defined. Preferably, the film is cooled at 100 to 1,000,000° C./min, more preferably at 1,000 to 100,000° C./min, even more preferably at 3,000 to 50,000° C./min. The temperature range within which the film is cooled at such a cooling rate is preferably at least 50° C., more preferably from 100 to 300° C., even more preferably from 150 to 280° C., still more preferably from 180 to 250° C.

Controlling the cooling rate in that manner may make it possible to further control the retardation expressibility of the transparent polymer film (in particular, cellulose acylate film) to be obtained. Concretely, a higher cooling rate improves the retardation expressibility. In addition, the alignment fluctuation of the polymer chains in the cellulose acylate film in the thickness direction thereof may be reduced, and the moisture-dependent curl of the film may be inhibited. The effect may be further augmented by controlling the cooling temperature range to fall within the above-mentioned preferred range at a relatively higher cooling rate. As a result, for example, a transparent polymer film (especially cellulose acylate film) satisfying both relational formulae of |Rth|/Re<0.5 and Re≧30 may be obtained. In addition, a transparent polymer film satisfying both relational formulae of |Rth|/Re<0.5 and Re≧60, a transparent polymer film satisfying both relational formulae of |Rth|/Re<0.5 and Re≧100, a transparent polymer film satisfying both relational formulae of |Rth|/Re<0.5 and Re≧150, a transparent polymer film satisfying both relational formulae of |Rth|/Re<0.5 and Re≧200 may also be obtained.

The above-mentioned cooling rate may be controlled by providing a cooling zone kept at a temperature lower than that in the heating zone after the heating zone, and transporting the transparent polymer film successively in those zones; or by contacting the film with a chill roll; or by spraying cold air onto the film; or by dipping the film in a cooled liquid. It is not necessary that the cooling rate is all the time constant in the cooling process. In the initial stage and in the final stage in the cooling process, the cooling rate may be small, and the cooling rate may be large between the stages. The cooling rate may be determined by measuring the temperature at different sites by the use of a thermocouple disposed above the film surface, as described in the Examples given hereinunder.

[Stretching after Heat Treatment]

In the production method of the invention, the transparent polymer film may be stretched successively after heat treatment. The stretching to be effected successively after heat treatment may be attained after the transparent polymer film after heat treatment is cooled to a temperature lower than Tc, or may be attained while the film keeps the heat treatment temperature without being cooled. In case where the polymer film is once cooled, the cooling may be spontaneous cooling to a temperature lower than Tc, or may be forced cooling to a temperature lower than Tc. After once cooled, the film may be again heated up to a temperature lower than Tc. The cooling temperature in the case where the film is once cooled is preferably lower by at least 50° C. than the above-mentioned heat treatment temperature, more preferably lower than it by from 100 to 300° C., even more preferably lower than it by from 150 to 250° C. The cooling temperature lower than the heat treatment temperature by at least 50° C. may make it possible to readily control the ratio Rth/Re of the film after heat treatment. Preferably, the film is once cooled to the cooling temperature, then again heated up to a temperature lower than Tc, and stretched in the condition. The difference between the heat treatment temperature and the stretching temperature is preferably at least 1° C., more preferably from 10 to 200° C., even more preferably from 30 to 150° C., still more preferably from 50 to 100° C. Suitably setting the temperature difference may well control the ratio Rth/Re. Concretely, when the difference between the heat treatment temperature and the stretching temperature is larger, then the ratio Rth/Re may increase; but when it is smaller, then the Rth/Re change may be smaller.

For the stretching method, employable is the method described in the above section of stretching during heat treatment. The stretching may be attained in one stage or in multiple stages. Preferred is the method of changing the rotation speed of nip rolls to thereby stretch the film in the transport direction, and the method of holding both sides of the polymer film with tenter clips to thereby expand the film in the direction perpendicular to the transport direction, as described hereinabove. More preferred embodiments are as follows: The film is not stretched during heat treatment; or the film is stretched in the transport direction by changing the rotation speed of nip rolls, and then both sides of the polymer film are held with tenter clips after heat treatment, and the film is thus expanded in the direction perpendicular to the transport direction.

The stretching ratio may be suitably determined depending on the necessary retardation of the transparent polymer film. Preferably, it is from 1 to 500%, more preferably from 3 to 400%, even more preferably from 5 to 300%, still more preferably from 10 to 100%. The stretching rate is preferably from 10 to 10000%/min, more preferably from 20 to 1000%/min, even more preferably from 30 to 800%/min.

The stretching after heat treatment makes it possible to control Re and Rth of the obtained transparent film. For example, when the stretching temperature after heat treatment is higher, then Rth may be lowered not so much changing Re. When the stretching ratio after heat treatment is higher, then Re may be lowered and Rth may be increased. Since these have a nearly linear correlation, the intended Re and Rth may be readily attained by suitably selecting the stretching condition after heat treatment.

After heat treatment, Re and Rth of the transparent polymer film before stretching are not specifically defined.

<<Transparent Polymer Film>>

(Optical Characteristics of Transparent Polymer Film of the Invention)

According to the above-mentioned production method of the invention, a transparent polymer film having a controlled retardation may be obtained. Concretely, according to the production method of the invention, a transparent polymer film with good retardation expression can be obtained. In particular, a transparent polymer film satisfying |Rth|/Re<0.5, which is not easy to produce according to conventional production methods, can be produced in a relatively simplified manner. |Rth|/Re of the transparent polymer film of the invention is more preferably at most 0.4, even more preferably at most 0.3, still more preferably at most 0.2.

(Retardation)

In this description, Re and Rth (unit: nm) are obtained according to the following method. A film to be analyzed is conditioned at 25° C. and a relative humidity of 60% for 24 hours. Using a prism coupler (MODEL 2010 Prism Coupler, by Metricon) and using a solid laser at 532 nm, the mean refractivity (n) of the film, which is represented by the following formula (a), is obtained at 25° C. and a relative humidity of 60%.

$$n = (n_{TE} \times 2 + n_{TM})/3 \tag{a}$$

wherein $n_{TE}$ is the refractive index measured with polarizing light in the in-plane direction of the film; and $n_{TM}$ is the refractive index measured with polarizing light in the normal direction to the face of the film.

Re(λ) and Rth(λ) represent, herein, the retardation in the plane and the retardation in the thickness direction, respectively, at a wavelength of λ(unit; nm). Re(λ) is measured with KOBRA 21ADH or WR (by Oji Scientific Instruments) while allowing light having the wavelength of λ nm to enter in the normal direction of a film.

In case where the film to be measured is a film that is represented by a uniaxial or biaxial indicatrix, Rth(λ) is computed by the following method.

That is, respective Re(λ)s are measured at total eleven points in the normal direction of the film relative to the film surface and in directions inclined every 10° from −50 up to +50° on one side from the normal line around an in-plane slow axis (determined by KOBURA 21ADH or WR) as an inclination axis (rotation axis) (in case where no slow axis exists, any direction in the plane of the film is defined as a rotation axis) for an incoming light of a wavelength of λ nm, and KOBRA 21ADH or WR computes the Rth(λ) on the basis of the measured retardation, an assumed value of an average refraction index and an input thickness.

In the above instance, when the retardations are expressed as Re and Rth without referring to specific λ, they are the values measured by use of the light in the wavelength of 590 nm. In case where a film has a direction in which the retardation becomes zero at a certain inclination angle from the normal line relative to the film surface around the in-plane slow axis direction (rotation axis), the retardation at an inclination angle greater than the inclination angle is computed by KOBRA 21ADH or WR after changing the sign thereof to negative.

Further, it is also possible to compute Rth according to the following formulae (b) and (c) by measuring the retardation in two arbitrarily inclined directions around the slow axis as the inclination axis (rotation axis) (in case where no slow axis exists, any direction in the plane of the film is defined as a rotation axis), and basing on the measured value, an assumed value on an average refraction index and an input thickness value.

$$Re(\theta) = \left[ nx - \frac{ny \times nz}{\sqrt{\left(ny\ \sin\left(\sin^{-1}\left(\frac{\sin(-\theta)}{nx}\right)\right)\right)^2 + \left(nz\ \cos\left(\sin^{-1}\left(\frac{\sin(-\theta)}{nx}\right)\right)\right)^2}} \right] \times \frac{d}{\cos\left\{\sin^{-1}\left(\frac{\sin(-\theta)}{nx}\right)\right\}} \tag{b}$$

wherein Re(θ) represents the retardation in a direction that inclines in the degree of θ from the normal direction. In the formula (b), nx represents the refraction index in the slow axis direction in the plane, ny represents the refraction index in the direction perpendicular to nx in the plane, and nz represents the refraction index in the direction perpendicular to the directions of nx and ny and d represents the thickness of the film.

$$Rth = ((nx+ny)/2 - nz) \times d \quad (c)$$

In case where the film to be measured is a film that can not be expressed by a uniaxial or biaxial indicatrix, that is, a so-called film having no optic axis, Rth(λ) is computed according to the following method.

Rth(λ) is computed from the retardation that is obtained by measuring the Re(λ) at total eleven points in directions inclined every 10° from −50° up to +50° from the normal line relative to the film surface around an in-plane slow axis (determined by KOBURA 21ADH or WR) as an inclination axis (rotation axis) for an incoming light of a wavelength of λ nm entering from each of the directions of inclination, an assumed value of an average refraction index and input thickness with KOBRA 21ADH or WR.

By inputting the value of these average refraction indices and thickness, KOBRA 21ADH or WR computes nx, ny, nz. From the computed nx, ny, nz, Nz=(nx−nz)/(nx−ny) is computed further.

According to the invention, the retardations Re(H %) and Rth(H %) in the in-plane direction and in the thickness direction at a relative humidity H (unit: %) are measured and calculated in the following manners. A film is stored in a humidity conditioning for 24 hours at 25° C. and a relative humidity of H %. Subsequently, the retardations of the film are measured and calculated at a measuring wavelength of 590 nm and a relative humidity of H % under the same conditions as above at 25° C. and a relative humidity of H %.

(Humidity Dependence)

In case that humidity is changed, the retardations of the transparent polymer film of the invention preferably satisfy the following formula.

Formula: $|Re(10\%) - Re(80\%)| < 50$ and $|Rth(10\%) - Rth(80\%)| < 50$.

In addition, the transparent polymer film of the invention more preferably satisfies the following formula.

Formula: $|Re(10\%) - Re(80\%)| < 30$ and $|Rth(10\%) - Rth(80\%)| < 40$.

The transparent polymer film of the invention even more preferably satisfies the following formula.

Formula: $|Re(10\%) | Re(80\%)| < 20$ and $|Rth(10\%) - Rth(80\%)| < 30$.

The transparent polymer film of the invention most preferably satisfies the following formula.

Formula: $|Re(10\%) - Re(80\%)| < 10$ and $|Rth(10\%) - Rth(80\%)| < 15$.

According to the transparent polymer film of the invention, in addition to the conditions relating to the retardations in case that humidity is changed as mentioned above, the retardations of the film preferably satisfy the following formula.

Formula: $|Re(10\%) - Re(80\%)|/Re < 3$ and $|Rth(10\%) - Rth(80\%)|/Rth < 3$.

In addition, the transparent polymer film of the invention more preferably satisfies the following formula.

Formula: $|Re(10\%) - Re(80\%)|/Re < 1$ and $|Rth(10\%) - Rth(80\%)|/Rth < 1$.

The transparent polymer film of the invention even more preferably satisfies the following formula.

Formula: $|Re(10\%) - Re(80\%)|/Re < 0.5$ and $|Rth(10\%) - Rth(80\%)|/Rth < 0.7$.

The transparent polymer film of the invention most preferably satisfies the following formula.

Formula: $|Re(10\%) - Re(80\%)|/Re < 0.2$ and $|Rth(10\%) - Rth(80\%)|/Rth < 0.4$.

Since the variation on the retardations of the film in case that the exterior environment is changed can be reduced by controlling the retardations in case that humidity is changed as mentioned above, it is possible to provide a liquid crystal display device having a high reliability.

(Slow Axis)

In the transparent polymer film of the invention, the angle θ formed between the transfer direction during the production and the slow axis of Re of the film is preferably 0±10° or 90±10°, more preferably 0±5° or 90±5°, even more preferably 0±3° or 90±3°, and as the case may be, it is preferably 0±1° or 90±1°, most preferably 90±1°.

(Thickness)

The thickness of the transparent polymer film of the invention is preferably 20 μm-180 μm, more preferably 40 μm-160 μm, even more preferably 60 μm-140 μm. When the thickness is less than 20 μm, the handling ability upon processing the film for a polarizer, or the curing of the polarizer is undesirable. The thickness unevenness of the transparent polymer film of the invention is preferably 0-2%, more preferably 0-1.5%, especially preferably 0-1%, in both of the transfer direction and the width direction.

(Moisture Permeability)

The moisture permeability of the transparent polymer film of the invention is preferably at least 100 g/(m²·day) in terms of the film having a thickness of 80 μm. When the film, of which the moisture permeability is at least 100 g/(m²·day) in terms of the film having a thickness of 80 μm, is used, then it may be directly stuck to a polarizing film. The moisture permeability in terms of the film having a thickness of 80 μm is preferably from 100 to 1500 g/(m²·day), more preferably from 200 to 1000 g/(m²·day), further more preferably from 300 to 800 g/(m²·day).

When the transparent polymer film of the invention is used as an outer protective film, which is not disposed between a polarizing film and a liquid crystal cell, as will be described hereinunder, then the moisture permeability of the transparent polymer film of the invention is preferably less than 500 g/(m²·day) in terms of the film having a thickness of 80 μm, more preferably from 100 to 450 g/(m²·day), even more preferably from 100 to 400 g/(m²·day), most preferably from 150 to 300 g/(m²·day). As defined to that effect, the durability of the polarizer resistant to moisture or wet heat may increase, and a liquid crystal display device of high reliability can be provided.

(Structure of Transparent Polymer Film)

The transparent polymer film of the invention may have a monolayer structure or a plurality structure, preferably has a monolayer structure. A film having a monolayer structure is a polymer film of one sheet, instead of one composed of a plurality of stuck film materials. Also included is one sheet of polymer film produced from a plurality of polymer solutions by a sequential flow casting system or co-flow casting system. In this case, a polymer film having a distribution in the thickness direction can be obtained by suitably adjusting the type or blending amount of an additive, the molecular weight distribution of the polymer, or the type of the polymer, etc. Also included is a film having various functional portions such as an optical anisotropic portion, an antiglare portion, a gas barrier portion or a moisture resistant portion in one film.

(Surface Treatment)

The transparent polymer film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred. The "glow discharge treatment" as referred to herein is a plasma treatment of treating a film surface in the presence of a plasma-exciting vapor. The details of the surface treatment are described in Hatsumei Kyokai Disclosure Bulletin (No. 2001-1745, issued on Mar. 15, 2001, Hatsumei Kyokai), and may be conveniently referred to herein.

For improving the adhesiveness between the film surface of the transparent polymer film of the invention and a functional layer to be formed thereon, an undercoat layer (adhesive layer) may be formed on the transparent polymer film in place of or in addition to the surface treatment as above. The undercoat layer is described in Hatsumei Kyokai Disclosure Bulletin (No. 2001-1745, issued on Mar. 15, 2001, Hatsumei Kyokai), page 32, which may be conveniently referred to herein. Functional layers that may be formed on the cellulose acylate film are described in Hatsumei Kyokai Disclosure Bulletin (No. 2001-1745, issued on Mar. 15, 2001, Hatsumei Kyokai), pp. 32-45, which may be conveniently referred to herein.

<<Retardation Film>>

The transparent polymer film of the invention may be used as a retardation film. "Retardation film" means an optical material that is generally used in display devices such as liquid crystal display devices and has optical anisotropy, and its meaning may be the same as that of retarder, optical compensatory film, and optical compensatory sheet. In a liquid crystal display device, the retardation film is used for the purpose of increasing the contrast of the display panel and improving the viewing angle characteristic and the coloration thereof.

Using the transparent polymer film of the invention makes it easy to produce a retardation film of which Re and Rth can be controlled in any desired manner.

Plural sheets of the transparent polymer film of the invention may be laminated, or the transparent polymer film of invention may be laminated with any other film not falling within the scope of the invention, and the resulting laminate films thus having suitably controlled Re and Rth may also be used as retardation films. For laminating the films, a paste or an adhesive may be used.

As the case may be, the transparent polymer film of the invention may be used as a support of retardation films. An optically anisotropic layer of liquid crystal may be provided on the support to give a retardation film. The optical-anisotropic layer applicable to the retardation film of the invention may be formed of, for example, a composition containing a liquid crystalline compound, a polymer film having birefringence or the transparent polymer film of the invention.

The liquid crystalline compound is preferably a discotic liquid crystalline compound or a rod-shaped liquid crystalline compound.

[Discotic Liquid Crystalline Compound]

Examples of the discotic liquid crystalline compound usable as the above-mentioned liquid crystalline compound in the invention are described in various publications (e.g., C. Destrade et al., *Mol. Crysr. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)).

Preferably, the discotic liquid crystalline molecules are fixed as aligned in the optically anisotropic layer; and most preferably, they are fixed through polymerization. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-Shaped Liquid Crystalline Compound]

Examples of the rod-shaped liquid crystalline compound usable as the above-mentioned liquid crystalline compound in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization. Examples of the polymerizing rod-shaped liquid crystalline compound usable in the invention are described, for example, in *Makromol. Chem.*, Vol. 190, page 2255 (1989); *Advanced Materials*, Vol. 5, page 107 (1993); U.S. Pat. Nos. 4,683,327, 5,622,648, 5,770,107; WO95/22586, WO95/24455, WO97/00600, WO98/23580, WO98/52905; JP-A-1-272551, JP-A-6-16616, JP-A-7-110469, JP-A-11-80081 and JP-A-2001-328973.

<<Polarizer>>

The transparent polymer film or the retardation film of the invention may be used as a protective film of a polarizer (polarizer of the invention). The polarizer of the invention comprises a polarizing film and two polarizer-protective films (transparent polymer films) that protect both surfaces of the film, in which the transparent polymer film or the retardation film of the invention may be used as at least one of the polarizer-protective films.

In case where the transparent polymer film of the invention is used as the polarizer-protective film, then it is desirable that the transparent polymer film of the invention is subjected to the above-mentioned surface treatment (described also in JP-A-6-94915, JP-A-6-118232) for hydrophilication. For example, the film is preferably subjected to glow discharge treatment, corona discharge treatment or alkali saponification treatment. In particular, when the polymer to constitute the transparent polymer film of the invention is cellulose acylate, then the surface treatment is most preferably alkali saponification treatment.

For the polarizing film, for example, herein usable is a polyvinyl alcohol film dipped and stretched in an iodine solution. In case where such a polyvinyl alcohol dipped and stretched in an iodine solution is used as the polarizing film, then the treated surface of the transparent polymer film of the invention may be directly stuck to both surfaces of the polarizing film with an adhesive. In the production method of the invention, it is desirable that the transparent polymer film is directly stuck to the polarizing film in that manner. The adhesive may be an aqueous solution of polyvinyl alcohol or polyvinyl acetal (e.g., polyvinyl butyral), or a latex of vinylic polymer (e.g., polybutyl acrylate). An especially preferred example of the adhesive is an aqueous solution of completely-saponified polyvinyl alcohol.

In a liquid crystal display device, in general, a liquid crystal cell is provided between two polarizers, and therefore, the device has four polarizer-protective films. The transparent polymer film of the invention may be used as any of the four polarizer-protective films. Especially advantageously in such a liquid crystal display device, the transparent polymer film of the invention is used as the protective film to be disposed between the polarizing film and the liquid crystal layer (liquid crystal cell). On the protective film to be disposed on the opposite side to the transparent polymer film of the invention via the polarizing film therebetween, optionally provided is a transparent hard-coat layer, an antiglare layer or an antireflection layer. In particular, the film of the invention is favorably used as the polarizer-protective film on the outermost surface of the display side of a liquid crystal display device.

<<Liquid Crystal Display Device>>

The transparent polymer film, the retardation film and the polarizer of the invention may be used in liquid crystal display devices of various display modes. Respective liquid crystal modes to which the films are applicable are described below. Of those modes, the transparent polymer film, the retardation film and the polarizer of the invention are favorably used in liquid crystal display devices of VA mode and IPS mode. The liquid crystal display devices may be any of transmission type, reflection type or semi-transmission type.

(TN-Type Liquid Crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The retardation film to be used in TN-type liquid crystal display devices is described in JP-A-3-9325, JP-A-6-148429, JP-A-8-50206, JP-A-9-26572; and Mori et al's reports (*Jpn. J. Appl. Phys.*, Vol. 36 (1997), p. 143; *Jpn. J. Appl. Phys.*, Vol. 36 (1997), p. 1068).

(STN-Type Liquid Crystal Display Device)

The transparent polymer film of the invention may be used as a support of the retardation film in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product (And) of the refractive anisotropy (Δn) of the rod-shaped liquid crystalline molecule and the cell gap (d) is within a range of from 300 to 1500 nm. The retardation film to be used in STN-type liquid crystal display devices is described in JP-A-2000-105316.

(VA-Type Liquid Crystal Display Device)

The transparent polymer film of the invention is especially advantageously used as the retardation film or as a support of the retardation film in a VA-type liquid crystal display device having a VA-mode liquid crystal cell. The VA-type liquid crystal display device may be a multi-domain system, for example, as in JP-A-10-123576. In these embodiments, the polarizer that comprises the transparent polymer film of the invention contributes to enlarging the viewing angle of the display panel and to improving the contrast thereof.

(IPS-Type Liquid Crystal Display Device and ECB-Type Liquid Crystal Display Device)

The transparent polymer film of the invention is especially advantageously used as the retardation film, as a support of the retardation film or as a protective film of the polarizer in an IPS-type liquid crystal display device and an ECB-type liquid crystal display device having an IPS-mode or ECB-mode liquid crystal cell. In the devices of these modes, the liquid crystal material is aligned nearly in parallel in black display, or that is, the liquid crystal molecules are aligned in parallel to the substrate face while no voltage is applied thereto, thereby giving black display. In these embodiments, the polarizer that comprises the transparent polymer film of the invention contributes to enlarging the viewing angle of the display panel and to improving the contrast thereof.

(OCB-Type Liquid Crystal Display Device and HAN-Type Liquid Crystal Display Device)

The transparent polymer film of the invention is also especially advantageously used as a support of the retardation film in an OCB-type liquid crystal display device having an OCB-mode liquid crystal cell and in an HAN-type liquid crystal display device having an HAN-mode liquid crystal cell. The retardation film to be used in an OCB-type liquid crystal display device and an HAN-type liquid crystal display device is preferably so designed that the direction in which the absolute value of the retardation of the film is the smallest does not exist both in the in-plane direction of the retardation film and in the normal direction thereof. The optical properties of the retardation film to be used in an OCB-type liquid crystal display device and an HAN-type liquid crystal display device may vary depending on the optical properties of the optically anisotropic layer therein, the optical properties of the support therein and the relative positioning of the optically anisotropic layer and the support therein. The retardation film to be used in an OCB-type liquid crystal display device and an HAN-type liquid crystal display device is described in JP-A-9-197397. It is described also in a Mori et al's report (*Jpn. J. Appl. Phys.*, Vol. 38 (1999), p. 2837).

(Reflection-Type Liquid Crystal Display Device)

The transparent polymer film of the invention may be advantageously used also as the retardation film in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO98/48320, and Japanese Patent 3022477. The retardation film for use in reflection-type liquid crystal display devices is described in WO0/65384.

(Other Liquid Crystal Display Devices)

The transparent polymer film of the invention may be advantageously used also as a support of the retardation film in an ASM (axially symmetric aligned microcell)-type liquid crystal display device having an ASM-mode liquid crystal cell. The ASM-mode liquid crystal cell is characterized in that the cell thickness is held by a position-adjustable resin spacer. The other properties of the cell are the same as those of the TN-mode liquid crystal cell. The ASM-mode liquid crystal cell and the ASM-type liquid crystal display device are described in a Kume et al's report (Kume et al., SID 98 Digest 1089 (1998)).

(Hard Coat Film, Antiglare Film, Antireflection Film)

As the case may be, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments of such antiglare film and antireflection film are described in detail in Hatsumei Kyokai Disclosure Bulletin (No. 2001-1745, issued on Mar. 15, 2001, Hatsumei Kyokai), pp. 54-57, and are preferably employed also for the transparent polymer film of the invention.

EXAMPLES

<<Measuring Method>>

Hereinafter, methods of measuring and evaluating the characteristics used in the following Examples and Comparative Examples will be described.
[Substitution Degree]
The substitution degree of acyl group of cellulose acylate was determined through $^{13}$C-NMR according to the method described in *Carbohydr. Res.* 273 (1995), 83-91 (by Tezuka, et al).
[Retardation]
Sampling was carried out at five portions in the width direction (center, edge portions (5% of the overall width from both edges), and respective two portions at the intermediate of the center and the edges) every 100 m in the longitudinal direction, and 2 cm-square samples were taken out and evaluated according to the above-described method. Then, the values for respective retardation portions were averaged to give Re, Rth, Re(10%), Re(80%), Rth(10%), and Rth(80%), respectively. Then, ΔRe and ΔRth were calculated in accordance with the following formulae (VIII) and (IX), and values of ΔRe/Re and ΔRth/Rth also calculated. The results are shown in Table 1.

$$\Delta Re = |Re(10\%) - Re(80\%)| \quad \text{Formula (VIII)}$$

$$\Delta Rth = |Rth(10\%) - Rth(80\%)| \quad \text{Formula (IX)}$$

Further, the difference between the maximum and the minimum values of declination (unit: °, a value can be −45° to +45°) in the direction of the slow axis from the transport direction or the direction perpendicular thereto at respective positions was obtained as the fluctuation range in the direction of the slow axis.

In Table 3, Table 5 and Table 6, the retardation was evaluated according to the following method.

First, the film is conditioned at 25° C. and a relative humidity of 60% for 24 hours. Using a prism coupler (MODEL 2010 Prism Coupler, by Metricon) and using a 632.8 nm H—Ne laser, the mean refractivity (n) of the film, which is represented by the following formula (a), is obtained at 25° C. and a relative humidity of 60%.

$$n = (n_{TE} \times 2 + n_{TM})/3 \quad \text{Formula (a)}$$

wherein $n_{TE}$ is the refractive index measured with polarizing light in the in-plane direction of the film; and $n_{TM}$ is the refractive index measured with polarizing light in the normal direction to the face of the film.

Next, the conditioned film is analyzed at 25° C. and a relative humidity of 60%, as follows: Using a birefringence gauge (ABR-10A, by Uniopt) and using a 632.8 nm He—Ne laser, the slow axis direction and the retardation are determined in the direction vertical to the sample film surface and in the direction inclined by ±40° from the film face normal line relative to the film in-plane slow axisslow axis as the inclination axis (rotation axis). Then, using the mean refractivity data obtained in the above, nx, ny and nz are calculated, and the in-plane retardation (Re) and the thickness-direction retardation (Rth) of the film, represented by the following formulae (b) and (c), respectively, are calculated.

$$Re = (nx - ny) \times d, \quad \text{Formula (b)}$$

$$Rth = \{(nx + ny)/2 - nz\} \times d, \quad \text{Formula (c)}$$

wherein nx indicates the film in-plane refractive index in the slow axisslow axis (x) direction; ny indicates the refractive index in the direction perpendicular to the film in-plane direction x; nz indicates the refractive index in the film thickness direction (film plane normal direction); d indicates the film thickness (nm); the slow axisslow axis is in the direction in which the refractive index is the maximum in the film plane.

[Fluctuation Range in the Direction of the Slow Axisslow Axis]
The difference between the maximum and the minimum values of declination (unit: °, a value can be −45° to +45°) in the direction of the slow axisslow axis from the transport direction or the direction perpendicular thereto at respective positions was obtained as the fluctuation range in the direction of the slow axisslow axis, as the same manner as the measuring method of the retardation.

[Glass Transition Temperature (Tg)]
Twenty mg of a transparent film before heat treatment was put into a sample pan of DSC under a current of nitrogen gas, and this was heated from 30° C. up to 120° C. at 10° C./min and maintained for 15 minutes, and then cooled down to 30° C. at −20° C./min. Next, this was again heated from 30° C. up to 250° C., and the temperature at which the base line begins to deviate from the low-temperature side was referred to as Tg of the polymer film before heat treatment.

[$Tm_0$]
20 mg of a polymer film before heat treatment was placed in a pan for the Differential Scanning Calorimetory (DSC) measurement and the temperature of the sample was raised from 30° C. to 120° C. at a rate of 10° C./min in a nitrogen stream and kept at the temperature for 15 minutes, followed by cooling to 30° C. at a rate of −20° C./min. Thereafter, the temperature of the sample was raised again from 30° C. to 300° C. and the temperature at the apex of an endothermal peak appeared during the temperature rising was adopted as $Tm_0$ of the polymer film before heat treatment.

[Tc]
Twenty mg of a polymer film before heat treatment was placed in a pan for the Differential Scanning Calorimetory (DSC) measurement and the temperature of the sample was raised from 30° C. to 120° C. at a rate of 10° C./min in a nitrogen stream and kept at the temperature for 15 minutes, followed by cooling to 30° C. at a rate of −20° C./min. Thereafter, the temperature of the sample was raised again from 30° C. to 300° C. and the temperature at the apex of an exothermal peak appeared during the temperature rising was adopted as Tc of the polymer film before heat treatment.

[Polymerization Degree]
The cellulose acylate produced herein is absolutely dried, then about 0.2 g thereof is accurately weighed, and dissolved in 100 mL of a mixed solvent of dichloromethane/ethanol=9/1 (by mass). Using an Ostwald viscometer, the time (second) taken by its dropping at 25° C. is counted, and the polymerization degree, DP of the polymer is calculated according to the following formulae:

$$\eta_{rel} = T/T_0$$

$$[\eta] = \ln(\eta_{rel})/C$$

$$DP = [\eta]/Km$$

wherein T indicates the time (second) taken by the dropping measurement sample; $T_0$ indicates the time (second) taken by the dropping solvent alone; ln indicates a natural logarithm; C indicates the concentration (g/L); Km is $6 \times 10^{-4}$.

[Polarization]
Two sheets of the polarizer manufactured herein are stuck together with their absorption axes kept in parallel to each other and the transmittance (Tp) thereof is measured; and they are stuck together with their absorption axes kept perpendicular to each other and the transmittance (Tc) thereof is measured. The polarization (P) of the polarizer is computed according to the following formula:

$$\text{Polarization}, P = ((Tp - Tc)/(Tp + Tc))^{0.5}$$

[Moisture Permeability]
In the invention, the moisture permeability is determined as follows: A cup with calcium chloride put therein is covered with the film to be tested and airtightly sealed up therewith, and this is left at 40° C. and 90% RH for 24 hours. From the mass change (g/(m²·day)) before and after the conditioning, the moisture permeability of the film is determined.

[Surface Shape of Film]

For the surface shape, the surface of the transparent polymer film thus obtained was observed by with the naked eye, and then evaluated according to the following evaluating scale.

⊚: Since the surface shape of the film is satisfactory, the film can be preferably used as an optical film.

o: Since the film is slightly wrinkled, the film can be preferably used as an optical film.

x: Since the film is apparently wrinkled or entirely whitened, the film can not be used as an optical film.

[Haze]

Five points (the center portion of the film, end portions (positions away from both end portions by 5% of the whole width)), and two points of middle portions between the center portion and the end portions) in the width direction of the film were sampled and then the average value of each point measured in accordance with the above-mentioned method was calculated to evaluate the haze value.

Hereinafter, the characteristics of the invention will be more concretely described with reference to the following Examples and Comparative Examples. In the following Examples, materials, the amount and the ratio thereof, details of the treatment, and the treatment process may be suitably modified within the range of not impairing the purpose of the invention. Accordingly, the invention should not be limitatively interpreted by the Examples mentioned below.

Synthesis Example 1

Synthesis of Cellulose Acetate Propionate 150 g of cellulose (hardwood pulp) and 75 g of acetic acid were added to 5 L separable flask equipped with a reflux device which is a reaction vessel, and the mixture was fiercely stirred for 2 hours while the flask was heated in an oil bath at 60° C. The cellulose subjected to the pre-treatment as above was swollen and dissolved to have a fluffy shape. Then, the reaction vessel was left and cooled in an iced water bath at 2° C. for 30 min.

Separately, a mixture of 1,545 g of a propionic anhydride and 10.5 g of sulphuric acid was prepared as an acylating agent, and cooled to −30° C. After that, the mixture was added at once to the reaction vessel in which the cellulose subjected to the pre-treatment was placed. After 30 minutes, exterior temperature was gradually increased in such a manner that interior temperature is adjusted to be 25° C. when 2 hours have passed after adding the acylating agent. The reaction vessel was cooled in the iced water bath at 5° C. in such a manner that the interior temperature is adjusted to be 10° C. when 0.5 hours have passed after adding the acylating agent, and adjusted to be 23° C. when 2 hours have passed after adding the acylating agent. Then, the mixture was stirred again for 3 hours while the interior temperature of the vessel was kept at 23° C. The reaction vessel was cooled in the iced water bath at 5° C., and 120 g of acetic acid having a water content of 25% by mass cooled to 5° C. was added to the vessel for 1 hour. The interior temperature was increased to 40° C. and the mixture was stirred for 1.5 hours. Subsequently, a solution in which magnesium acetate tetrahydrate aqueous is dissolved by twice as much as sulphuric acid in mol in acetic acid having water content of 50% by mass is added to the reaction vessel, and then the mixture was stirred for 30 min. To the mixture, 1 L of acetic acid having a water content of 25% by mass, 500 mL of acetic acid having a water content of 33% by mass, 1 L of acetic acid having a water content of 50% by mass, and 1 L of water were added in such an order, thereby precipitating cellulose acetate propionate. The obtained precipitate of cellulose acetate propionate was washed with warm water. By varying a washing condition at that time, cellulose acetate propionate having different amount of residual sulphuric acid root can be obtained. After washing, the precipitate of cellulose acetate propionate was stirred in a calcium hydroxide aqueous solution of 0.005% by mass at 20° C. for 0.5 hours. Subsequently, the precipitate of cellulose acetate propionate was washed again with water till the pH of a washing solution became 7 and vacuum dried at 70° C.

According to $^1$H-NMR and GPC measurement, the obtained cellulose acetate propionate had the acetylation degree of 0.30, the propionylation degree of 2.63, and the polymerization degree of 320. The content of the sulphuric acid root was measured in accordance with ASTM D-817-96.

Synthesis Example 2

Synthesis of Cellulose Acetate Butylate 100 g of cellulose (hardwood pulp) and 135 g of acetic acid were added to 5 L separable flask equipped with a reflux device which is a reaction vessel, and the flask was heated in an oil bath at 60° C. and left for 1 hour. After that, the mixture was fiercely stirred for 1 hour while the flask was heated in an oil bath at 60° C. The cellulose subjected to the pre-treatment as above was swollen and dissolved to have a fluffy shape. The reaction vessel was lest in an iced water bath at 5° C. for 1 hour to sufficiently cool the cellulose.

Separately, a mixture of 1,080 g of a butyric acid anhydride and 10.0 g of sulphuric acid was prepared as an acylating agent, and cooled at −20° C. After that, the mixture was added at once to the reaction vessel in which the cellulose subjected to the pre-treatment was placed. After 30 minutes, exterior temperature was gradually increased to 20° C., and the mixture was reacted for 5 hours. The reaction vessel was cooled in the iced water bath at 5° C., and 2,400 g of acetic acid having a water content of 12.5% by mass cooled to 5° C. was added to the vessel for 1 hour. The interior temperature was increased to 30° C. and the mixture was stirred for 1 hour. After that, to the reaction vessel, 100 g of magnesium acetate tetrahydrate aqueous solution having a water content of 50% by mass was added and the mixture was stirred for 30 min. To the mixture, 1,000 g of acetic acid and 2,500 g of acetic acid having a water content of 50% by mass were gradually added, thereby precipitating cellulose acetate butylate. The obtained precipitate of cellulose acetate butylate was washed with warm water. By varying a washing condition at that time, cellulose acetate butylate having different amount of residual sulphuric acid root can be obtained. After washing, the precipitate of cellulose acetate butylate was stirred in a calcium hydroxide aqueous solution having a water content of 0.005% by mass for 0.5 hours. Subsequently, the precipitate of cellulose acetate butylate was washed again with water till the pH of a washing solution became 7 and dried at 70° C. The obtained cellulose acetate butylate had the acetylation degree of 0.84, the butyrylation degree of 2.12, and the polymerization degree of 268.

Examples 101 to 112

Comparative Examples 101 to 103

Production of Transparent Polymer Film (Preparation of Polymer Solution)
1) Cellulose Acylate In respective Examples and Comparative Examples, cellulose acylate having the substitution degree described in Table 1 was synthesized with reference to the above-mentioned Preparation Examples, and then Used. Each Cellulose Acylate was heated and dried at 120° C. to have a water content of 0.5% by mass or less. After that, 15 parts by mass of cellulose acylate was used.

2) Solvent

In respective Examples and Comparative Examples, a mixed solvent in which dichloromethane/methanol/butanol (83/15/2 parts by mass) are mixed was used. Each solvent had the water content of 0.2% by mass or less.

3) Additive

In respective Examples and Comparative Examples, either an additive A or B having the following composition was selected and used according to Table 1.

Additive A:
Silicon dioxide fine particles (particle size: 20 nm, Mohs hardness: about 7) (0.08 parts by mass)

Additive B:
Triphenyl phosphate (1.2 parts by mass)
Biphenyldiphenyl phosphate (0.6 parts by mass)
Silicon dioxide fine particles (particle size: 20 nm, Mohs hardness: about 7) (0.08 parts by mass)

4) Swelling, Dissolution:

In respective Examples and Comparative Examples, the solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5 \times 10^4$ kgf/m/sec$^2$ [$4.9 \times 10^5$ N/m/sec$^2$]) and a stirring shaft that has an anchor blade at the center axis thereof and runs at a peripheral speed of 1 m/sec (shear stress, $1 \times 10^4$ kgf/m/sec$^2$ × [$9.8 \times 10^4$ N/m/sec$^2$]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete dissolution. The heating time was 15 minutes. In this stage, the filter, the housing and the pipe line that are exposed to high temperature are all made of Hastelloy alloy having good corrosion resistance; and the system is covered with a jacket for circulating a heat carrier therethrough for keeping the system warmed and heated.

Next, this was cooled to 36° C. to obtain a cellulose acylate solution.

5) Filtration

The cellulose acylate solution thus obtained was filtered through a paper filter sheet (#63, manufactured by Toyo Roshi Kabushiki Kaisha, Ltd.) having an absolute filtration accuracy of 10 μm, and then through a sintered metal filter sheet (FH025, manufactured by Pall corporation) having an absolute filtration accuracy of 2.5 μm to obtain a polymer solution.

(Manufacture of Film)

The cellulose acylate solution was heated at 30° C., passed through a caster, Giesser (described in JP-A-11-314233), and cast onto a mirror-faced stainless support having a band length of 60 m and set at 15° C., at a casting speed of 50 m/min. The casting width was 200 cm. The space temperature in the entire casting zone was set at 15° C. At 50 cm before the end point of the casting zone, the cellulose acylate film thus cast and rolled was peeled off from the band, and exposed to drying air applied thereto at 45° C. Next, this was dried at 110° C. for 5 minutes and then at 140° C. for 10 minutes to obtain a transparent film of cellulose acylate having a thickness of 80 μm.

(Heat Treatment)

The obtained film was subjected to heat treatment using an apparatus having a heating zone between two pairs of nip rolls. The length/breadth ratio (distance between two pairs of nip rolls/base width) was adjusted to be 3.3, the heating zone was kept at a temperature as shown in Table 1, and the film was cooled to a temperature of 25° C. at 1000° C./min after it was conveyed through two pairs of nip rolls. The elongation of the film was obtained according to the following formula in such a manner that marked lines were given to the film at a constant interval in the direction perpendicular to the transport direction of the film and the interval was measured before and after the heat treatment.

Elongation of film(%)=100×{(interval of marked lines after heat treatment)−(interval of marked lines before heat treatment)}/interval of marked lines before heat treatment In addition, the contraction ratio in the width direction in the heat treatment step of the films of Examples 101 to 112 and Comparative Examples 101 to 103 obtained according to the following formula was within a range of from 5 to 50%.

Contraction ratio in the width direction of film(%)= 100×{(total width before heat treatment)−(total width after heat treatment)}/total width before heat treatment (Evaluation of Transparent Polymer Film)

The respective transparent polymer films thus obtained were evaluated. The results are shown in Table 1 below.

The slow axisslow axis of Re of the film was observed in the width direction in Examples 101 to 112, and observed in the transport direction of the film in Comparative Example 101. The variation (variation of values measured at five portions) of Re and Rth evaluated based on the above-mentioned method was at most ±1 nm and at most ±2 nm, respectively, for all the samples. The fluctuation range in the direction of the slow axisslow axis was below 1°. The samples of Examples 101 to 112 and Comparative Examples 101 to 103 had a moisture permeability falling within from 400 to 1200 g/(m$^2$·day), as calculated in terms of the film having a thickness of 80 μm. Before heat treatment, the moisture permeability of these films all fell within a range of from 250 to 1000 g/(m$^2$·day).

TABLE 1

| | Cellulose acylate | | | | | | Temperature of the | Elongation | |
| | SA + SB | SB Propionyl | Butyryl | Additives | Tc [° C.] | Tm$_0$ [° C.] | heating zone [° C.] | of the film [%] | Surface shape |
| --- | --- | --- | --- | --- | --- | --- | --- | --- | --- |
| Example 101 | 2.90 | 0.8 | 0 | A | 175 | 240 | 200 | 20 | ◎ |
| Example 102 | 2.90 | 0.8 | 0 | A | 175 | 240 | 200 | 30 | ◎ |
| Example 103 | 2.90 | 0.8 | 0 | B | 170 | 230 | 200 | 20 | ◎ |

TABLE 1-continued

| | | | | | | | | | |
|---|---|---|---|---|---|---|---|---|---|
| Comparative Example 101 | 2.90 | 0.8 | 0 | A | 175 | 240 | 160 | 20 | ◎ |
| Example 104 | 2.90 | 0.8 | 0 | A | 175 | 240 | 180 | 20 | ◎ |
| Example 105 | 2.90 | 0.8 | 0 | A | 175 | 240 | 220 | 20 | ◎ |
| Example 106 | 2.90 | 0 | 0.8 | A | 175 | 220 | 180 | 20 | ◎ |
| Example 107 | 2.90 | 0.4 | 0.4 | A | 175 | 230 | 180 | 20 | ◎ |
| Example 108 | 2.85 | 0.7 | 0 | A | 190 | 250 | 230 | 20 | ◎ |
| Example 109 | 2.80 | 0.7 | 0 | A | 205 | 230 | 210 | 20 | ◎ |
| Comparative Example 102 | 2.80 | 2.5 | 0 | A | 205 | 200 | 210 | 20 | X |
| Example 110 | 2.95 | 0.7 | 0 | A | 165 | 250 | 200 | 20 | ◎ |
| Example 111 | 2.95 | 1.2 | 0 | A | 165 | 230 | 200 | 20 | ◎ |
| Example 112 | 2.95 | 2.0 | 0 | A | 165 | 220 | 200 | 20 | ◎ |
| Comparative Example 103 | 2.85 | 0 | 0 | A | 195 | 290 | 180 | 30 | X |

| | Re (mean value) [nm] | Rth (mean value) [nm] | \|Rth\|/Re (mean value) | ΔRe (mean value) [nm] | ΔRth (mean value) [nm] | ΔRe/Re (mean value) | ΔRth/Rth (mean value) | Fluctuation range of the slow axis [°] |
|---|---|---|---|---|---|---|---|---|
| Example 101 | 112 | −49 | 0.44 | 30 | 22 | 0.27 | 0.45 | 0.1 |
| Example 102 | 125 | −61 | 0.49 | 34 | 23 | 0.27 | 0.38 | 0.1 |
| Example 103 | 119 | −41 | 0.34 | 25 | 19 | 0.21 | 0.46 | 0.1 |
| Comparative Example 101 | 4 | −49 | 12.25 | 5 | 22 | 1.25 | 0.45 | 0.1 |
| Example 104 | 70 | −35 | 0.50 | 20 | 18 | 0.29 | 0.51 | 0.1 |
| Example 105 | 180 | −65 | 0.36 | 43 | 26 | 0.24 | 0.40 | 0.1 |
| Example 106 | 60 | −29 | 0.48 | 8 | 12 | 0.13 | 0.41 | 0.2 |
| Example 107 | 65 | −32 | 0.49 | 13 | 15 | 0.20 | 0.47 | 0.2 |
| Example 108 | 145 | −59 | 0.41 | 45 | 24 | 0.31 | 0.41 | 0.1 |
| Example 109 | 28 | −13 | 0.46 | 17 | 23 | 0.61 | 1.77 | 0.1 |
| Comparative Example 102 | — | — | — | — | — | — | — | — |
| Example 110 | 131 | −60 | 0.46 | 30 | 22 | 0.23 | 0.37 | 0.1 |
| Example 111 | 126 | −59 | 0.47 | 18 | 18 | 0.14 | 0.31 | 0.1 |
| Example 112 | 121 | −59 | 0.49 | 11 | 12 | 0.09 | 0.20 | 0.2 |
| Comparative Example 103 | — | — | — | — | — | — | — | — |

As shown in Table 1, the transparent polymer film which had large Re value could be produced by subjecting the cellulose acylate to the heat treatment at temperature T, which satisfies the formula $Tc \leq T < Tm_0$. Under such heat treatment condition, a transparent film which satisfied relatively low |Rth|/Re value. Especially a transparent polymer film satisfying |Rth|/Re<0.5 that was not able to be manufactured without a complex process before could be easily manufactured. And a transparent polymer film which was subjected to the heat treatment at temperature T, which satisfies the formula $Tc \leq T < Tm_0$ showed reduced humidity dependency and small fluctuation range of the retardation.

Examples 115 to 118

Production of Transparent Polymer Film

Transparent polymer films were manufactured according to the method described in Example 101 to 112 under the following condition. The additive A having the same composition described in Example 101 to 112 and the cellulose acetate having specific substitute degree described in table 2 were used, and the specific heat treatment condition was described in table 2.

The results of the evaluation of transparent polymer films were also described in Table 2.

TABLE 2

| | | | | Before the heat treatment | | | Temperature of the heating zone [° C.] | Elongation of the film [%] | After the heat treatment | | | |
|---|---|---|---|---|---|---|---|---|---|---|---|---|
| | Substitution degree of cellulose acylate | Tc [° C.] | Tm₀ [° C.] | Re (mean value) [nm] | Rth (mean value) [nm] | \|Rth\|/Re (mean value) | | | Surface shape | Re (mean value) [nm] | Rth (mean value) [nm] | \|Rth\|/Re (mean value) |
| Example 115 | 2.85 | 195 | 290 | 1 | 4 | 4.0 | 240 | 20 | ◎ | 153 | −80 | 0.52 |
| Example 116 | 2.94 | 155 | 290 | 1 | −51 | 51 | 240 | 20 | ◎ | 243 | −64 | 0.26 |
| Example 117 | 2.94 | 155 | 290 | 1 | −51 | 51 | 220 | 20 | ◎ | 184 | −84 | 0.46 |
| Example 118 | 2.68 | 215 | 285 | 5 | 43 | 8.6 | 240 | 20 | ○ | 18 | −27 | 1.50 |

As shown in Table 2, the transparent polymer film which had large Re value could be produced by subjecting the cellulose acylate to the heat treatment at temperature T, which satisfies the formula $Tc \leqq T < Tm_0$. As is also shown in Table 2, expressibility of the retardation of the transparent polymer film was improved by increasing the substitute degree of the cellulose acetate.

Examples 120 to 140

Comparative Examples 121

Production of Transparent Polymer Film (Preparation of Polymer Solution)
1) Cellulose Acylate In respective Examples 120 to 138 and Comparative Examples 121, the cellulose acylate A or B described later was used according to Table 3. Each cellulose acylate was heated and dried at 120° C. to have a water content of 0.5% by mass or less. After that, 15 parts by mass of cellulose acylate was used.

Cellulous Acylate A:

Powder of cellulous acetate having a substitution degree of 2.85 was used. In cellulous acylate A, a viscosity-average polymerization degree was 300, a substitution degree of 6-acetyl group was 0.89, a acetone extraction was 7 mass %, a ratio of mass average molecular weight/number average molecular weight was 2.3, a percentage of water content was 0.2 mass %, a viscosity of 6 mass %-dichloromethane solvent was 305 mPa·s, residual acetic acid amount was 0.1 mass % or less, Ca-containing amount was 65 ppm, Mg-containing amount was 26 ppm, Fe-containing amount was 0.8 ppm, sulphuric acid ion-containing amount was 18 ppm, a yellow index was 1.9, and free acetic acid amount was 47 ppm. An average particle size was 1.5 mm and a standard deviation was 0.5 mm.

Cellulous Acylate B:

Powder of cellulous acetate having a substitution degree of 2.95 was used. In cellulous acylate B, a viscosity-average polymerization degree was 300 and a substitution degree of 6-acetyl group was 0.94 (the moisture permeability in terms of the film having a thickness of 80 μm at 40° C. and 90% RH was from 400 to 1200 g/(m²·day)).

2) Solvent

In respective Examples and Comparative Examples, any one of the following solvents A and B was selected and used according to Table 3. Each solvent had the water content of 0.2% by mass or below.

Solvent A:

A mixed solvent in which dichloromethane/methanol/butanol (83/15/2 parts by mass) are mixed was used.

Solvent B:

A mixed solvent in which dichloromethane/methanol (83/17 parts by mass) are mixed was used.

Solvent C:

A mixed solvent in which dichloromethane/methanol (92/8 parts by mass) are mixed was used.

Solvent D:

A mixed solvent in which dichloromethane/methanol (97/3 parts by mass) are mixed was used.

Solvent E:

A mixed solvent in which dichloromethane (100 parts by mass) was used.

3) Additive

Either an additive A or B having the same composition described in Examples 101 to 112 was selected and used according to Table 3.

4) Dissolution

In respective Examples and Comparative Examples, the dissolution process A or B described later was used according to Table 3.

Dissolution Process A:

The solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5 \times 10^4$ kgf/m/sec² [$4.9 \times 10^5$ N/m/sec²]) and a stirring shaft that has an anchor blade at the center axis thereof and runs at a peripheral speed of 1 m/sec (shear stress, $1 \times 10^4$ kgf/m/sec² [$9.8 \times 10^4$ N/m/sec²]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete dissolution. The heating time was 15 minutes. In this stage, the filter, the housing and the pipe line that are exposed to high temperature are all made of Hastelloy alloy having good corrosion resistance; and the system is covered with a jacket for circulating a heat carrier therethrough for keeping the system warmed and heated.

Next, this was cooled to 36° C. to obtain a cellulose acylate solution.

Dissolution Process B:

The solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5 \times 10^4$ kgf/m/sec² [$4.9 \times 10^5$ N/m/sec²]) and a stirring shaft that has an anchor blade at the center axis thereof and runs at a peripheral speed of 1 m/sec (shear stress, $1 \times 10^4$ kgf/m/sec² [$9.8 \times 10^4$ N/m/sec²]). For the swelling, the high-speed stirring shaft was stopped and the peripheral speed of the anchor blade-having stirring shaft was reduced to 0.5 m/sec.

The swollen solution in the tank was transported via a screw pump of which center part of the shaft was heated to 30° C., and passed through a cooling part, which was cooled from the periphery part of the screw, at −70° C. for 3 min. The cooling process was carried out by using refrigerant of −75° C. cooled in a refrigerator. The mixture obtained by the cooling process was transported to the stainless vessel via the screw pump of which column was heated to 30° C.

Next, this was stirred at 30° C. for 2 hours to obtain a cellulose acylate solution.

5) Filtration

The cellulose acylate solution thus obtained was filtered through a paper filter sheet (#63, manufactured by Toyo Roshi Kabushiki Kaisha, Ltd.) having an absolute filtration accuracy of 10 μm, and then through a sintered metal filter sheet (FH025, manufactured by Pall Corporation) having an absolute filtration accuracy of 2.5 μm to obtain a polymer solution.

(Manufacture of Film)

In respective Examples and Comparative Examples, either a film-forming process A or B described later was selected and used according to Table 3.

Film-Forming Process A:

The cellulose acylate solution was heated to 30° C., passed through a caster, Giesser (described in JP-A-11-314233), and cast onto a mirror-faced stainless support having a band length of 60 m and the surface temperature of the mirror-faced stainless support was set at 15° C., at a casting speed of 50 m/min. The casting width was 200 cm. The space temperature in the entire casting zone was set at 15° C. At 50 cm before the end point of the casting zone, the cellulose acylate film thus cast and rolled was peeled off from the band and exposed to drying air applied thereto at 45° C. Next, this was dried at 110° C. for 5 minutes and then at 140° C. for 10 minutes to obtain a transparent film of cellulose acylate having a thickness of 80 μm.

Film-Forming Process B:

The polymer solution was heated to 30° C., passed through a caster, Giesser, and cast onto a mirror-faced stainless support which is a drum having a diameter of 3 m. The temperature of the surface of the support was set at −5° C., a casting speed was set at 100 m/min, and the casting width was 200 cm. The space temperature in the entire casting zone was set at 15° C. At 50 cm before the end point of the casting zone, the cellulose acylate film thus cast and rolled was peeled off from the drum, and then the both ends of the film was clipped with pin tenters. The cellulose acylate film held with pin tenters was transported to a drying zone. At first, the film was exposed to drying air applied thereto at 45° C. Next, this was dried at 110° C. for 5 minutes and then at 140° C. for 10 minutes to obtain a transparent film of cellulose acylate having a thickness of 80 μm.

(Heat Treatment)

A heat treatment was subjected to the obtained film by using a device having a heating zone between two nip rolls. A longitudinal/transverse ratio (distance between nip rolls/base width) was adjusted to be 3.3, the base temperature before the film enters the heating zone was set to 25° C., and the film was heated in the heating zone at the temperature described in Table 3. The heating rate of the film in this step was controlled to be the value as in Table 3. In Examples in which the heating rate is lower than 1,000° C./min, the heating rate was controlled by changing the hot air flow; and in Examples in which the heating rate is not lower than 1,000° C./min, the heating rate was controlled by additionally using an IR heater.

Next, the film was cooled to the cooling temperature as in Table 3 at the rate shown in Table 3, and then led to pass between the nip rolls. For cooling the film, used was cold moisture-free air, and the cooling rate was controlled by changing the cold airflow. The heat-treatment temperature, the heating rate, the cooling temperature and the cooling rate of the film were obtained from the data monitored with the thermocouple disposed above the film. Specifically, the heating rate was obtained by calculating the difference between the temperature at the heating zone inlet and the temperature at the heating zone outlet followed by dividing the resulting value by the time taken by the film to move between those two points. Similarly, the cooling rate was obtained by calculating the difference between the temperature at the cooling zone inlet and the temperature at the cooling zone outlet followed by dividing the resulting value by the time taken by the film to move between those two points.

The elongation of the film was measured before and after the heat treatment. Width direction elongation ratio before and after the heat treatment process was 5 to 60% (the maximum ratio was set higher than in that of Examples 101 to 112) in Example 120 to 138 and Comparative Example 121.

In the Table 3, TAC A indicates commercial cellulose acylate film (FUJITAC TD80UL; manufactured by Fuji Film Co., Ltd.) and TAC B indicates commercial cellulose acylate film (FUJITAC T80UZ; manufactured by Fuji Film Co., Ltd.). TAC B and TAC A were used and subjected to the heat treatment and the cooling process under the conditions described in Table 3 in Example 139 and Example 140, respectively.

(Evaluation of Produced Cellulose Acylate Film)

The maximum value of Re, Rth, |Rth|/Re and humidity curl of the respective transparent cellulose acylate films thus obtained in respective examples and comparative examples were evaluated. The results are shown in Table 3 below. The slow axis slow axis of Re of the film was observed in the width direction of the film in Examples 120 to 127 and 129 to 139, and observed in the transport direction of the film in Example 128. The variation (variation of values measured at five portions) of Re and Rth evaluated based on the above-mentioned method was at most ±1 nm and at most ±2 nm, respectively, for all the samples. The fluctuation range in the direction of the slow axis slow axis was below 1°. The moisture permeability in terms of the film having a thickness of 80 μm was from 300 to 1000 g/(m²·day) in Example 120 to 140 and Comparative Example 121, and those of the films before the heat treatment were also from 300 to 1000 g/(m²·day) for all samples.

TABLE 3

| | Cellulose acylate | Solvent | Additives | Dissolution process | Film-forming process | Tc [° C.] | $Tm_0$ [° C.] | Temperature of the heating zone [° C.] |
|---|---|---|---|---|---|---|---|---|
| Example 120 | A | A | A | A | A | 195 | 290 | 240 |
| Example 121 | A | B | A | A | A | 200 | 290 | 240 |
| Example 122 | A | C | A | A | A | 200 | 290 | 240 |
| Example 123 | A | D | A | A | A | 200 | 290 | 240 |
| Example 124 | A | E | A | A | A | 200 | 290 | 240 |
| Example 125 | A | A | A | A | B | 190 | 285 | 240 |
| Example 126 | B | A | B | B | A | 150 | 285 | 240 |
| Example 127 | B | A | A | B | A | 155 | 290 | 240 |
| Example 128 | B | A | B | B | A | 150 | 290 | 150 |
| Example 129 | B | A | A | B | A | 155 | 290 | 180 |
| Example 130 | B | A | A | B | A | 155 | 290 | 220 |
| Comparative Example 121 | B | A | A | B | A | 155 | 290 | 300 |
| Example 131 | B | A | A | B | A | 155 | 290 | 240 |
| Example 132 | B | A | A | B | A | 155 | 290 | 240 |
| Example 133 | B | A | A | B | A | 155 | 290 | 240 |
| Example 134 | B | A | A | B | A | 155 | 290 | 240 |

TABLE 3-continued

| | | | | | | | | |
|---|---|---|---|---|---|---|---|---|
| Example 135 | B | A | A | B | A | 155 | 290 | 240 |
| Example 136 | B | A | A | B | A | 155 | 290 | 240 |
| Example 137 | B | A | A | B | A | 155 | 290 | 240 |
| Example 138 | B | A | A | B | A | 155 | 290 | 240 |
| Example 139 | (TAC B) | — | — | — | — | 190 | 285 | 240 |
| Example 140 | (TAC A) | — | — | — | — | 185 | 280 | 240 |

| | Heating rate [° C./min] | Cooling temperature [° C.] | Cooling rate [° C./min] | Elongation of the film [%] | Re (mean value) [nm] | Rth (mean value) [nm] | \|Rth\|/Re (mean value) | Humidity curl (max value) [m$^{-1}$] |
|---|---|---|---|---|---|---|---|---|
| Example 120 | 500 | 25 | 1,000 | 20 | 166 | −69 | 0.42 | 2 |
| Example 121 | 500 | 25 | 1,000 | 20 | 165 | −69 | 0.42 | 2 |
| Example 122 | 500 | 25 | 1,000 | 20 | 114 | −68 | 0.60 | 1 |
| Example 123 | 500 | 25 | 1,000 | 20 | 102 | −71 | 0.70 | 2 |
| Example 124 | 500 | 25 | 1,000 | 20 | 144 | −109 | 0.76 | 2 |
| Example 125 | 500 | 25 | 1,000 | 20 | 118 | 18 | 0.15 | 0 |
| Example 126 | 500 | 25 | 1,000 | 20 | 263 | −73 | 0.28 | 1 |
| Example 127 | 500 | 25 | 1,000 | 20 | 246 | −86 | 0.35 | 1 |
| Example 128 | 500 | 25 | 1,000 | 20 | 16 | −7 | 0.44 | 1 |
| Example 129 | 500 | 25 | 1,000 | 20 | 98 | −48 | 0.49 | 1 |
| Example 130 | 500 | 25 | 1,000 | 20 | 199 | −79 | 0.40 | 1 |
| Comparative Example 121 | 500 | — | — | — | — | — | — | — |
| Example 131 | 500 | 25 | 10 | 20 | 225 | −78 | 0.35 | 20 |
| Example 132 | 500 | 25 | 100 | 20 | 236 | −82 | 0.35 | 12 |
| Example 133 | 500 | 25 | 10,000 | 20 | 251 | −89 | 0.35 | 2 |
| Example 134 | 500 | 25 | 100,000 | 20 | 254 | −90 | 0.35 | 0 |
| Example 135 | 500 | 25 | 100,000 | 40 | 288 | −93 | 0.32 | 0 |
| Example 136 | 10 | 25 | 1,000 | 20 | 243 | −82 | 0.34 | 9 |
| Example 137 | 100 | 25 | 1,000 | 20 | 244 | −84 | 0.34 | 5 |
| Example 138 | 10,000 | 25 | 1,000 | 20 | 248 | −87 | 0.35 | 1 |
| Example 139 | 500 | 25 | 1,000 | 20 | 174 | −59 | 0.34 | 2 |
| Example 140 | 500 | 25 | 1,000 | 20 | 128 | 27 | 0.21 | 0 |

As shown in Table 3, the transparent polymer film which had large Re value could be produced by subjecting the cellulose acylate to the heat treatment at temperature T, which satisfies the formula $Tc \leq T < Tm_0$. Under such heat treatment condition, a transparent polymer film which satisfied relatively low |Rth|/Re value can be obtained. Especially a transparent polymer film satisfying |Rth|/Re<0.5 that was not able to be manufactured without a complex process before could be easily manufactured. It was confirmed that increasing the cooling rate after the heat treatment could further improve the retardation of the obtained transparent polymer films and could inhibit the films from curling in moisture. Further, as in Examples 120 to 123, it is understood that when the alcohol content of the solvent is increased, then the Re and Rth expression range could broaden. In Comparative Example 121, the film was melted during transportation, and was cut.

Examples 141 to 154

Comparative Examples 141, 142

Production of Transparent Polymer Film (Preparation of Polymer Solution)
1) Cellulose Acylate The cellulose acylates A or B described in Examples 120 to 140 was selected and used according to Table 4. Each cellulose acylate was heated and dried at 120° C. to have a water content of 0.5% by mass or less. After that, 15 parts by mass of cellulose acylate was used.
2) Solvent In respective Examples and Comparative Examples, a mixed solvent in which dichloromethane/methanol/butanol (83/15/2 parts by mass) are mixed was used. The solvent had the water content of 0.2% by mass or below.

3) Additive

In respective Examples and Comparative Examples, Silicon dioxide fine particles (particle size: 20 nm, Mohs hardness: about 7) (0.08 parts by mass) was used.
4) Dissolution The dissolution process A or B described in Examples 120 to 140 was selected and used according to Table 4.
5) Filtration The cellulose acylate solution thus obtained was filtered through a paper filter sheet (#63, manufactured by Toyo Roshi Kabushiki Kaisha, Ltd.) having an absolute filtration accuracy of 10 µm, and then through a sintered metal filter sheet (FH025, manufactured by Pall Corporation) having an absolute filtration accuracy of 2.5 µm to obtain a polymer solution.
(Production of Film)

A film-forming process A or B described in Examples 120 to 140 was selected and used according to Table 4. The amount of residual solvent was 0.5% by mass.
(Preliminary Stretching)

In Examples and Comparative Examples, the following preliminary stretching step A or B is selected, and shown in Table 4.

The preliminary stretching ratio of the film was obtained as follows: Marked lines are given to the film at a predetermined distance in the direction perpendicular to the transport direction of the film, and the distance between them is measured before and after heat treatment. The ratio is obtained according to the following formula.

Film Preliminary Stretching Ratio(%)=100×(marked line distance after heat treatment−marked line distance before heat treatment)/(marked line distance before heat treatment).

Preliminary Stretching Step A:

The cellulose acylate film formed in the above film formation step A or B is stretched, using a device having a heating zone between two nip rolls. The stretching is controlled by changing the peripheral speed of the nip rolls. The longitudinal/transverse ratio (roll-to-roll distance/base width) is controlled to be 3.3; the base temperature before the heating zone is 25° C.; and the temperature in the heating zone is as in Table 4. In the zone, the film is heated for 1 minute.

Preliminary Stretching Step B:

The obtained film is longitudinally monoaxially stretched, using a roll stretcher. As the roll of the roll stretcher, used is an induction heating jacket roll having a mirror-finished surface. The temperature of each roll can be conditioned individually. The stretching zone is covered with a casing, and the temperature therein is as in Table 4. The former roll in the stretching zone is so set that it could be gradually heated up to the stretching temperature described in Table 4. The stretching distance is conditioned so that the longitudinal/transverse ratio could be 3.3; and the stretching speed is 10%/min relative to the stretching distance.

Preliminary Stretching Step C:

The obtained film is held by tenter clips, and stretched by 20% in the width direction while led to pass through a heating zone.

(Heat Treatment)

In respective Examples and Comparative Examples, the heat treating method used was selected from following heat treating method A or B and was shown in Table 4. After the heat treatment, the film was cooled to 25° C. at 500° C./min.

The stretching ratio of the film was obtained according to the following formula in such a manner that marked lines were given to the film at a constant interval in the direction perpendicular to the transport direction of the film and the interval was measured before and after the heat treatment and was 20%.

Stretching ratio of film(%)=100×{(interval of marked lines after heat treatment)−(interval of marked lines before heat treatment)}/interval of marked lines before heat treatment Heat Treatment Process A A heat treatment was subjected to the obtained film by using a device having a heating zone between two nip rolls. A contraction ratio in the width direction was controlled by adjusting the temperature of the heating zone and the circumferential velocity of the nip rolls (the contraction ratio in the width direction was 30% in Heat Treatment Process A). A longitudinal/transverse ratio (distance between nip rolls/base width) was adjusted to be 3.3, the base temperature before the film enters the heating zone was set to 25° C., and the film was heated in the heating zone at the temperature described in Table 4 for one minute.

Heat Treatment Process B

Heat Treatment Process B was performed in the same manner as Heat Treatment Process A other than the heating time of 60 minutes different from the heating time of Heat Treatment Process A.

(Evaluation of Produced Cellulose Acylate Film)

The cellulose acylate films obtained in Examples and Comparative Examples were evaluated. The results are shown in Table 4 below.

Samples taken out in the same manner as that for the above-mentioned retardation measurement were analyzed for the Re and Rth fluctuation (fluctuation of 5 points measured data). Except those of Example 152, all the samples had an Re fluctuation range within ±1 nm, an Rth fluctuation range within ±2 nm, and a slow axisslow axis direction fluctuation range of less than 1°. The in-plane slow axisslow axis direction in all Examples was in the direction of 90° relative to the film transport direction. The samples of Examples 141 to 154 and Comparative Examples 141 and 142 had a moisture permeability falling within from 400 to 1200 g/(m²·day), as calculated in terms of the film having a thickness of 80 μm. Before heat treatment, the moisture permeability of these films all fell within a range of from 250 to 1000 g/(m²·day). In addition, the contraction ratio in the width direction in the heat treatment process of these films was within a range of from 5 to 50%.

TABLE 4

| | Cellulose acylate | Dissolution process | Film-forming process | Tg [° C.] | Tc [° C.] | $Tm_0$ [° C.] | Preliminary Stretching Process | Temperature [° C.] |
|---|---|---|---|---|---|---|---|---|
| Example 141 | A | A | A | 160 | 195 | 290 | A | 170 |
| Example 142 | A | A | A | 160 | 195 | 290 | A | 170 |
| Example 143 | A | A | A | 160 | 195 | 290 | A | 160 |
| Example 144 | A | A | A | 160 | 195 | 290 | A | 195 |
| Example 145 | A | A | A | 160 | 195 | 290 | A | 170 |
| Example 146 | A | A | B | 160 | 190 | 290 | A | 170 |
| Example 147 | A | A | B | 160 | 190 | 290 | B | 170 |
| Example 148 | B | B | A | 162 | 155 | 290 | A | 170 |
| Example 149 | B | B | B | 162 | 150 | 290 | A | 170 |
| Example 150 | A | A | A | 160 | 195 | 290 | Process was not done | — |
| Example 151 | A | A | B | 160 | 190 | 290 | Process was not done | — |
| Example 152 | A | A | A | 160 | 195 | 290 | A | 120 |
| Example 153 | A | A | A | 160 | 195 | 290 | A | 220 |
| Example 154 | A | A | A | 160 | 195 | 290 | A | 170 |
| Example 155 | A | A | A | 160 | 195 | 290 | C | 170 |
| Comparative Example 141 | A | A | A | 160 | 195 | 290 | A | 170 |
| Comparative Example 142 | A | A | A | 160 | 195 | 290 | A | 170 |

TABLE 4-continued

|  | Preliminary Stretching Stretching ratio [%] | Heat treatment Process | Heat treatment Temperature [° C.] | Haze [%] | Re (mean value) [nm] | Rth (mean value) [nm] | \|Rth\|/Re (mean value) |
|---|---|---|---|---|---|---|---|
| Example 141 | 20 | A | 240 | 0.3 | 192 | −93 | 0.48 |
| Example 142 | 30 | A | 240 | 0.3 | 227 | −107 | 0.47 |
| Example 143 | 20 | A | 240 | 0.3 | 203 | −98 | 0.48 |
| Example 144 | 20 | A | 240 | 0.3 | 182 | −88 | 0.48 |
| Example 145 | 20 | A | 260 | 0.3 | 248 | −118 | 0.48 |
| Example 146 | 20 | A | 240 | 0.2 | 181 | 10 | 0.06 |
| Example 147 | 20 | A | 240 | 0.2 | 183 | 10 | 0.05 |
| Example 148 | 20 | A | 240 | 0.3 | 249 | −118 | 0.47 |
| Example 149 | 20 | A | 240 | 0.2 | 210 | 1 | 0.00 |
| Example 150 | — | A | 240 | 0.3 | 155 | −76 | 0.49 |
| Example 151 | — | A | 240 | 0.2 | 115 | 27 | 0.23 |
| Example 152 | 10 | A | 240 | 0.3 | (174) | (−80) | 0.46 |
| Example 153 | 20 | A | 240 | 0.3 | 158 | −74 | 0.47 |
| Example 154 | 20 | B | 240 | 3.2 | 228 | −102 | 0.45 |
| Example 155 | 20 | A | 240 | 0.2 | 129 | −60 | −0.47 |
| Comparative Example 141 | 20 | A | 180 | — | — | — | — |
| Comparative Example 142 | 20 | A | 300 | — | — | — | — |

As in Table 4, the heat treatment at a temperature T to satisfy $Tc \leq T \leq Tm_0$ gives transparent polymer films having large retardation expressibility and having a relatively small |Rth|/Re. In particular, transparent polymer films satisfying |Rth|/Re<0.5 can be obtained with ease, which, however, could not be heretofore produced if not employing a complicated process. Preliminary stretching may further improve the retardation of the obtained transparent polymer films. In particular, transparent polymer films having a larger Re and a small |Rth|/Re may be produced. In this case, it is desirable that the preliminary stretching direction is the same as the stretching direction in heat treatment from the viewpoint of retardation increase. In Comparative Example 141, the film was whitened; and in Comparative Example 142, the film was melted during transportation, and was cut.

Examples 161 to 172

(Film Formation)

From the following films A to C, those shown in Table 5 were selected and used.

Film A:

A film was produced according to Example 12 in JP-A-2005-104148, and this is Film A.

Film B:

A commercial product, Fujitac (TD80UF, by Fuji Film) was used as such.

Film C:

A commercial product, Fujitac (T80UZ, by Fuji Film) was used as such.

(Heat Treatment)

The obtained film was heat-treated, using a device having a heating zone between two nip rolls. The longitudinal/transverse ratio (roll-to-roll distance/base width) was controlled to be 3.3; the temperature in the heating zone was as in Table 5; and after having passed through the two nip rolls, the film was cooled to the temperature shown in Table 5 at 500° C./min. The contraction ratio in the width direction in the heat treatment step of the films of Examples 161 to 172 was within a range of from 5 to 50%.

(Stretching)

Next, both sides of the heat-treated film were held with tenter clips, and the film was stretched in the direction perpendicular to the transport direction, in the heating zone. The temperature in the heating zone is as in Table 5.

(Evaluation of Transparent Polymer Film)

The obtained transparent polymer films were evaluated. The results are shown in Table 5. The slow axisslow axis of Re of the stretched film was observed in the direction perpendicular to the film transport direction in all the films. The Re and Rth fluctuation (5 points measured data fluctuation), as evaluated according to the above-mentioned method, was Re within ±1 nm and Rth within ±2 nm in all samples. The moisture permeability of the films of Examples 161 to 172, as calculated in terms of the film having a thickness of 80 μm, was all within a range of from 400 to 1200 g/(m²·day); and before heat treatment, the moisture permeability of these films was all within a range of from 250 to 1000 g/(m²·day).

TABLE 5

|  | ① Unprocessed film | | | | | | | | ② Heat treatment | | ③ Cooling process Temperature [° C.] |
|---|---|---|---|---|---|---|---|---|---|---|---|
|  | Type of film | Tg [° C.] | Tc [° C.] | $Tm_0$ [° C.] | Re (mean value) [nm] | Rth (mean value) [nm] | Thickness [nm] | Moisture permeability [g/m²·day] | Temperature [° C.] | Elongation of the film [%] | |
| Example 161 | A | 140 | 185 | 280 | 2 | 45 | 80 | 420 | 200 | 50 | 25 |
| Example 162 | A | 140 | 185 | 280 | 2 | 45 | 80 | 420 | 220 | 40 | 25 |
| Example 163 | A | 140 | 185 | 280 | 2 | 45 | 80 | 420 | 240 | 0 | 25 |

TABLE 5-continued

| | | | | | | | | | | | |
|---|---|---|---|---|---|---|---|---|---|---|---|
| Example 164 | A | 140 | 185 | 280 | 2 | 45 | 80 | 420 | 240 | 40 | 25 |
| Example 165 | A | 140 | 185 | 280 | 2 | 45 | 80 | 420 | 240 | 40 | 25 |
| Example 166 | A | 140 | 185 | 280 | 2 | 45 | 80 | 420 | 240 | 40 | 25 |
| Example 167 | A | 140 | 185 | 280 | 2 | 45 | 80 | 420 | 240 | 40 | 25 |
| Example 168 | A | 140 | 185 | 280 | 2 | 45 | 80 | 420 | 240 | 40 | 100 |
| Example 169 | A | 140 | 185 | 280 | 2 | 45 | 80 | 420 | 240 | 40 | 150 |
| Example 170 | B | 140 | 185 | 280 | 3 | 43 | 80 | 420 | 200 | 50 | 25 |
| Example 171 | B | 140 | 185 | 280 | 3 | 43 | 80 | 420 | 240 | 20 | 25 |
| Example 172 | A | 140 | 185 | 280 | 2 | 45 | 80 | 420 | 240 | 40 | 25 |

| | ③Cooling process | | ④Stretching | | | | | | | |
|---|---|---|---|---|---|---|---|---|---|---|
| | (Heat treatment temperature) − (cooling temperature) [° C.] | Rth (mean value) [nm] | Temperature [° C.] | Stretching ratio [%] | (Heat treatment temperature) − (Stretching temperature) [° C.] | Surface shape | Re (mean value) [nm] | Rth (mean value) [nm] | \|Rth\|/Re (mean value) | Fluctuation range of the slow axis [°] |
| Example 161 | 175 | 21 | 160 | 10 | 40 | ◎ | 60 | 27 | 0.45 | 0.2 |
| Example 162 | 195 | 22 | 160 | 20 | 60 | ◎ | 81 | 40 | 0.49 | 0.1 |
| Example 163 | 215 | 23 | 160 | 20 | 80 | ◎ | 95 | 40 | 0.42 | 0.2 |
| Example 164 | 215 | 27 | 160 | 10 | 80 | ◎ | 121 | 40 | 0.33 | 0.1 |
| Example 165 | 215 | 27 | 160 | 20 | 80 | ◎ | 114 | 53 | 0.46 | 0.1 |
| Example 166 | 215 | 27 | 200 | 20 | 40 | ◎ | 126 | 38 | 0.30 | 0.1 |
| Example 167 | 215 | 27 | 220 | 20 | 20 | ◎ | 129 | 41 | 0.32 | 0.2 |
| Example 168 | 140 | 28 | 160 | 20 | 80 | ◎ | 91 | 36 | 0.40 | 0.1 |
| Example 169 | 90 | 31 | 160 | 20 | 80 | ◎ | 69 | 34 | 0.49 | 0.2 |
| Example 170 | 175 | 22 | 150 | 10 | 50 | ◎ | 63 | 28 | 0.44 | 0.1 |
| Example 171 | 215 | 26 | 150 | 20 | 90 | ◎ | 100 | 44 | 0.44 | 0.1 |
| Example 172 | 215 | 27 | — | — | — | ○ | 127 | 30 | 0.24 | 0.1 |

As in Table 5, the heat treatment at a temperature T to satisfy $Tc \leq T \leq Tm_0$ gives transparent polymer films having large retardation and having a relatively small |Rth|/Re. Further, stretching after heat treatment enables minor control of Re and Rth.

Examples 181 to 192

Production of Transparent Polymer Film (Preparation of Polymer Solution)
1) Polymer:
   Cellulose acylate A described in Examples 120 to 140 was used. The polymer A was heated and dried at 120° C. to have a reduced water content of at most 0.5% by mass, and 20 parts by mass of the polymer A was used herein.
2) Solvent
   In respective Examples, a mixed solvent in which dichloromethane/methanol/butanol (83/15/2 parts by mass) are mixed was used. The solvent had the water content of 0.2% by mass or below.
3) Additive
   In respective Examples, any one of additive compositions A to D having the following compositions was used according to Table 6 below.
   Additive Composition A:
   Silicon dioxide fine particles (particle size: 20 nm, Mohs hardness: about 7) (0.08 parts by mass)
   Additive Composition B:
   Triphenyl phosphate (1.6 parts by mass)
   Biphenyldiphenyl phosphate (0.8 parts by mass)
   Silicon dioxide fine particles (particle size: 20 nm, Mohs hardness: about 7) (0.08 parts by mass)
   Additive Composition C:
   Triphenyl phosphate (1.6 parts by mass)
   Biphenyldiphenyl phosphate (0.8 parts by mass)
   Retardation-enhancing agent having the following structure (0.6 parts by mass)

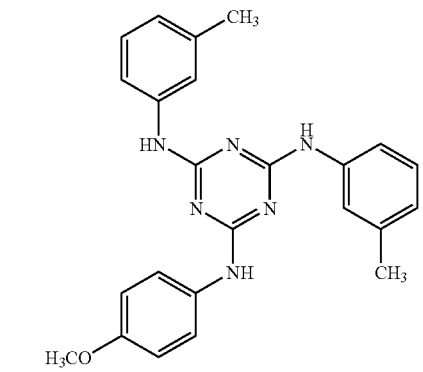 [SMILES: COc1ccc(Nc2nc(Nc3cccc(C)c3)nc(Nc3cccc(C)c3)n2)cc1]

Silicon dioxide fine particles (particle size 20 nm, Mohs hardness about 7) (0.08 parts by mass)
   Additive Composition D:
   Triphenyl phosphate (1.6 parts by mass)
   Biphenyldiphenyl phosphate (0.8 parts by mass)
   Retardation-increasing agent used in Additive Composition C (0.3 parts by mass)
   Silicon dioxide fine particles (particle size 20 nm, Mohs hardness about 7) (0.08 parts by mass)
4) Swelling, Dissolution:
   In respective Examples, the solvent and the additive mentioned above were put into a 400-liter stainless solution tank, which has stirring blades and is cooled with cooling water that runs around its periphery. With stirring and dispersing them therein, the polymer was gradually added to the tank. After the addition, this was stirred at room temperature for 2 hours. After thus swollen for 3 hours, this was again stirred to obtain a polymer solution.
   For the stirring, used were a dissolver-type eccentric stirring shaft that runs at a peripheral speed of 15 m/sec (shear stress, $5 \times 10^4$ kgf/m/sec$^2$ [$4.9 \times 10^5$ N/m/sec$^2$]) and a stirring shaft that has an anchor blade at the center axis thereof and runs at a peripheral speed of 1 m/sec (shear stress, $1 \times 10^4$ kgf/m/sec$^2$ [$9.8 \times 10^4$ N/m/sec$^2$]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete solution. The heating time was 15 minutes. In this stage, the filter, the housing and the pipe line that are exposed to high temperature are all made of Hastelloy alloy of good corrosion resistance; and the system is covered with a jacket for heat carrier circulation therethrough for keeping the system warmed and heated.

Next, this was cooled to 36° C. to obtain a polymer solution.

5) Filtration:

The thus-obtained polymer solution was filtered through a paper filter sheet (#63, by Toyo Filter) having an absolute filtration accuracy of 10 μm, and then through a sintered metal filter sheet (FH025, by Paul) having an absolute filtration accuracy of 2.5 μm to obtain a polymer solution.

(Formation of Film)

In respective Examples and Comparative Examples, either a film forming process A or B was selected and used according to Table 6 below.

Film-Forming Process A:

The polymer solution was heated at 30° C., passed through a caster, Giesser (described in JP-A-11-314233), and cast onto a mirror-faced stainless support having a band length of 60 m and set at 15° C., at a casting speed of 50 m/min. The casting width was 200 cm. The space temperature in the entire casting zone was set at 15° C. At 50 cm before the end point of the casting zone, the polymer film thus cast and rolled was peeled off from the band, and exposed to drying air applied thereto at 45° C. Next, this was dried at 110° C. for 5 minutes and then at 140° C. for 10 minutes to obtain a transparent film of cellulose acylate.

Film-Forming Process B:

The polymer solution was heated at 30° C., passed through a caster, Giesser, and cast onto a mirror-faced stainless support which is a drum having a diameter of 3 m. The temperature of the surface of the support was set at −5° C., a casting speed was set at 100 m/min, and the casting width was 200 cm. The space temperature in the entire casting zone was set at 15° C. At 50 cm before the end point of the casting zone, the cellulose acylate film thus cast and rolled was peeled off from the drum, and then the both ends of the film was clipped with pin tenters. The cellulose acylate film held with pin tenters was transported to a drying zone. At first, the film was exposed to drying air applied thereto at 45° C. Next, this was dried at 110° C. for 5 minutes and then at 140° C. for 10 minutes to obtain a transparent film of cellulose acylate.

(Heat Treatment)

The obtained film was subjected to heat treatment using an apparatus having a heating zone between two pairs of nip rolls. The length/breadth ratio (distance between two pairs of nip rolls/base width) was adjusted to be 3.3, the heating zone was kept at a temperature as listed in Table 6, and the film was cooled to a temperature as listed in Table 6 at 500° C./min after it was conveyed through two pairs of nip rolls. The width direction elongation ratio of the film was in the range of 5 to 50% during the heat treatment processing in Examples 181 to (Stretching)

Subsequently, the film after the heat treatment was clipped at both ends thereof with tenter clips, and then stretched in the direction perpendicular to the transport direction in the heating zone. Temperature of the heating zone was described in Table 6.

(Evaluation of Transparent Polymer Film)

The obtained respective transparent polymer films were evaluated. The results are shown in Table 6 below. Rth after the cooling in Example 182 was evaluated in in-line operation.

The slow axisslow axis of Re of the film after the stretching was observed in the direction perpendicular to the transport direction for all Examples. The fluctuation (fluctuation of 5 points measured data) of Re and Rth evaluated based on the above-mentioned method was at most ±1 nm and at most ±2 nm, respectively, for all the samples. The moisture permeability in terms of the film having a thickness of 80 μm was from 400 to 1200 g/(m$^2$·day) in Example 181 to 192, and those of the films before the heat treatment were also from 250 to 1000 g/(m$^2$·day) for all samples.

TABLE 6

| | | Obtained film by film-forming process | | | | | | | | Heat treatment | | Cooling |
|---|---|---|---|---|---|---|---|---|---|---|---|---|
| | Additives | Film-forming process | Tg [° C.] | Tc [° C.] | Tm$_0$ [° C.] | Re (mean value) [nm] | Rth (mean value) [nm] | Thickness [nm] | Moisture permeability [g/m$^2$ · day] | Termperature [° C.] | Elongation of the film [%] | process Termperature [° C.] |
| Example 181 | A | A | 150 | 195 | 290 | 2 | 5 | 80 | 990 | 200 | 0 | 25 |
| Example 182 | A | A | 150 | 195 | 290 | 2 | 5 | 80 | 990 | 200 | 0 | 150 |
| Example 183 | A | A | 150 | 195 | 290 | 2 | 5 | 80 | 990 | 220 | 0 | 25 |
| Example 184 | A | A | 150 | 195 | 290 | 2 | 5 | 80 | 990 | 220 | 0 | 25 |
| Example 185 | A | A | 150 | 195 | 290 | 2 | 5 | 80 | 990 | 240 | 0 | 25 |
| Example 186 | A | A | 150 | 195 | 290 | 2 | 5 | 80 | 990 | 240 | 0 | 25 |
| Example 187 | A | A | 150 | 195 | 290 | 2 | 5 | 80 | 990 | 240 | 0 | 25 |
| Example 188 | A | A | 150 | 195 | 290 | 2 | 5 | 80 | 990 | 240 | 0 | 25 |
| Example 189 | A | A | 150 | 195 | 290 | 2 | 5 | 80 | 990 | 240 | 40 | 25 |
| Example 190 | B | A | 140 | 190 | 285 | 1 | 41 | 80 | 520 | 220 | 0 | 25 |
| Example 191 | C | A | | 190 | 285 | 6 | 103 | 80 | 510 | 240 | 40 | 25 |
| Example 192 | D | B | 140 | 185 | 285 | 10 | 82 | 80 | 510 | 240 | 20 | 25 |
| Example 193 | (TAC B) | | 140 | 190 | 285 | 1 | 48 | 80 | 500 | 220 | 0 | 25 |
| Example 194 | A | A | 150 | 195 | 290 | 2 | 5 | 80 | 990 | 240 | 0 | 25 |

TABLE 6-continued

|  | Cooling process ||| Stretching ||| Evaluation of the film after the stretching |||||
|---|---|---|---|---|---|---|---|---|---|---|---|
|  | (Heat treatment temperature) − (cooling temperature) [° C.] | Rth (mean value) [nm] | Moisture permeability [g/m² · day] | Temperature [° C.] | Stretching ratio [%] | (Heat treatment temperature) − (Stretching temperature) [° C.] | Re (mean value) [nm] | Rth (mean value) [nm] | \|Rth\|/Re (mean value) | (Rth after stretching) − (Rth before stretching) [nm] | Moisture permeability [g/m² · day] |
| Example 181 | 175 | −29 | 770 | 160 | 10 | 40 | 41 | −3 | 0.07 | 26 | 770 |
| Example 182 | 60 | −10 | — | 160 | 10 | 40 | 37 | −1 | 0.03 | 9 | 780 |
| Example 183 | 195 | −54 | 740 | 160 | 20 | 60 | 99 | −10 | 0.10 | 44 | 750 |
| Example 184 | 195 | −54 | 740 | 200 | 20 | 20 | 102 | −23 | 0.23 | 31 | 740 |
| Example 185 | 215 | −68 | 720 | 160 | 20 | 80 | 143 | −9 | 0.06 | 59 | 720 |
| Example 186 | 215 | −68 | 720 | 160 | 15 | 80 | 151 | −29 | 0.19 | 39 | 710 |
| Example 187 | 215 | −68 | 720 | 150 | 30 | 80 | 128 | 9 | 0.07 | 77 | 740 |
| Example 188 | 215 | −68 | 720 | 210 | 20 | 30 | 151 | −49 | 0.32 | 19 | 710 |
| Example 189 | 215 | −68 | 720 | 160 | 20 | 80 | 158 | −13 | 0.08 | 54 | 720 |
| Example 190 | 195 | −29 | 380 | 150 | 20 | 70 | 92 | −3 | 0.03 | 26 | 390 |
| Example 191 | 215 | 119 | 370 | — | — | — | 41 | 119 | 0.34 | — | 370 |
| Example 192 | 215 | 73 | 370 | — | — | — | 31 | 73 | 0.42 | — | 370 |
| Example 193 | 195 | −27 | 390 | 150 | 20 | 70 | 90 | −1 | 0.01 | 26 | 400 |
| Example 194 | 215 | −68 | 720 | — | — | — | 162 | −83 | 0.51 | — | 720 |

As shown in Table 6, the transparent polymer film which had large retardation and relatively small |Rth|/Re value could be produced by subjecting the produced film to the heat treatment at temperature T, which satisfies the formula $Tc \leqq T < Tm_0$. And when the stretching process was performed after the heat treatment, Re and Rth were further slightly controlled.

Examples 201 to 212

Comparative Examples 201 to 205

Preparation of Polymer Solution

1) Cellulose Acylate
The cellulose acylates A or B described in Examples 120 to 140 was selected and used according to Table 7. Each cellulose acylate was heated and dried at 120° C. to have a water content of 0.5% by mass or less. After that, 15 parts by mass of cellulose acylate was used.

2) Solvent
The solvent A or B in Examples 120 to 140 was selected and used according to Table 7. The solvent had the water content of 0.2% by mass or below.

3) Additive
The additive A or B described in Examples 101 to 112 was selected and used according to Table 7.

4) Dissolution
The dissolution process A or B described in Examples 101 to 112 was selected and used according to Table 7.

5) Filtration
The cellulose acylate solution thus obtained was filtered through a paper filter sheet (#63, manufactured by Toyo Roshi Kabushiki Kaisha, Ltd.) having an absolute filtration accuracy of 10 μm, and then through a sintered metal filter sheet (FH025, manufactured by Pall Corporation) having an absolute filtration accuracy of 2.5 μm to obtain a polymer solution.
(Manufacture of Film)

In respective Examples and Comparative Examples, either a film-forming process A or B described later was used according to Table 7.

Film-Forming Process A:
The cellulose acylate solution was heated to 30° C., passed through a caster, Giesser (described in JP-A-11-314233), and cast onto a mirror-faced stainless support having a band length of 60 m and the surface temperature of the mirror-faced stainless support was set at 15° C. The coating width was 200 cm. The space temperature in the entire casting zone was set at 15° C. At 50 cm before the end point of the casting zone, the cellulose acylate dope thus cast and rolled was peeled off from the band and then the both ends of the dope was clipped with tenters. The amount of a residual solvent of the cellulose acylate web, the speed for the support of peeling off (peeling off roll draw), and the surface temperature of the film of the cellulose acylate web at the instant of peeling off were shown in Table 7. The cellulose acylate web held with tenters was exposed to drying air applied thereto at 45° C. Next, this was dried at 110° C. for 5 minutes and then at 140° C. for 10 minutes to be taken up for obtaining a 3000 m of roll after trimming the both edges (5% of total width) immediately before taking up and after knurling the both edges at a width of 10 mm and a height of 50 μm. The width of the thus-obtained transparent film was 1.5 m at each level and the thickness was 80 μm.

Film-Forming Process B:
The above-mentioned polymer solution was heated to 30° C., passed through a caster, Giesser, and cast onto a mirror-faced stainless support which is a drum having a diameter of 3 m. The temperature of the surface of the support was set at −5° C., and the casting width was 200 cm. The space temperature in the entire casting zone was set at 15° C. At 50 cm before the end point of the casting zone, the cellulose acylate film thus cast and rolled was peeled off from the drum, and then the both ends of the film was clipped with pin tenters. The amount of a residual solvent of the cellulose acylate web, the speed for the support of peeling off (peeling off roll draw), and the surface temperature of the film of the cellulose acylate web at the instant of peeling off were shown in Table 7. The cellulose acylate web held with pin tenters was transported to a drying zone. At first, the film was exposed to drying air applied thereto at 45° C. Next, this was dried at 110° C. for 5 minutes and then at 140° C. for 10 minutes to be taken up for obtaining a 3000 m of roll after trimming the both edges (5% of total width) immediately before taking up and after knurling the both edges at a width of 10 mm and a height of 50 μm. The width of the thus-obtained transparent film was 1.5 m at each level and the thickness was 80 μm.

(Heat Treatment)

In respective Examples and Comparative Examples, the heat treating method used was selected from following heat treating processes A to C and was described in Table 7. After the heat treatment, the film was cooled to 25° C. at 500° C./min.

The elongation of the film was obtained according to the following formula in such a manner that marked lines were given to the film at a constant interval in the direction perpendicular to the transport direction of the film and the interval was measured before and after the heat treatment.

Elongation of film(%)=100×{(interval of marked lines after heat treatment)−(interval of marked lines before heat treatment)}/interval of marked lines before heat treatment Heat Treatment Process A A heat treatment was subjected to the obtained film in roll to roll operation by using a device having a heating zone between two nip rolls. A contraction ratio in the width direction was controlled by adjusting the temperature of the heating zone and the circumferential velocity of the nip rolls. A longitudinal/transverse ratio (distance between nip rolls/base width) was adjusted to be 3.3, the base temperature before the film enters the heating zone was set to 25° C., and the film was heated in the heating zone at the temperature described in Table 7 for one minute.

Heat Treatment Process B

While both ends of the obtained film was gripped by tenter clips, the film was subjected to the heat treatment in roll to roll operation by using a device which allows the film to pass through the heating zone. A contraction ratio in the width direction was controlled by adjusting a width of a rail. The base temperature before the film enters the heating zone was set to 25° C. and the film was heated in the heating zone at the temperature described in Table 7 for one minute.

Heat Treatment Process C

Heat Treatment Process C was performed in the same manner as Heat Treatment Process B other than the heating time of 60 minutes different from the heating time of Heat Treatment Process B.

(Evaluation of Produced Cellulose Acylate Film)

The respective cellulose acylate films thus obtained in respective examples and the comparative examples were evaluated. The results are shown in Table 7 below.

The fluctuation (fluctuation of 5 points measured data) of respective Re and Rth samples obtained in the same manner as the above-mentioned retardation measurement evaluated based on the above-mentioned method was at most ±1 nm and at most ±2 nm, respectively, for all the samples. The fluctuation range in the direction of the slow axis was below 1°. The moisture permeability in terms of the film having a thickness of 80 μm was from 400 to 1200 g/(m²·day) in Examples 201 to 212 and Comparative Examples 201 to 205, and those of the films before the heat treatment were also from 250 to 1000 g/(m²·day) for all samples.

TABLE 7

| | | | | | Film-forming process | | | | |
|---|---|---|---|---|---|---|---|---|---|
| | Cellulose acylate | Solvent | Additives | Dissolution process | Type of film | volatile components [%] | Elongation [%] | (Support temperature) − (web temperature) [° C.] | Tc [° C.] | Tm$_0$ [° C.] |
| Example 201 | A | A | B | A | A | 50 | 1 | 5 | 190 | 285 |
| Example 202 | A | B | B | A | A | 50 | 5 | 6 | 190 | 285 |
| Example 203 | A | B | B | A | A | 50 | 5 | 5 | 190 | 285 |
| Example 204 | A | B | B | A | A | 50 | 5 | 5 | 190 | 285 |
| Example 205 | A | A | A | A | A | 50 | 5 | 6 | 195 | 290 |
| Example 206 | A | A | B | A | B | 100 | 5 | 2 | 190 | 285 |
| Example 207 | A | A | B | A | B | 270 | 5 | 3 | 190 | 285 |
| Example 208 | A | A | B | A | B | 270 | 10 | 3 | 185 | 285 |
| Example 209 | A | A | B | A | B | 270 | 15 | 3 | 185 | 285 |
| Example 210 | A | A | B | A | B | 370 | 5 | 4 | 190 | 285 |
| Example 211 | B | B | A | B | A | 50 | 5 | 6 | 155 | 290 |
| Example 212 | B | A | A | B | B | 270 | 5 | 3 | 155 | 290 |
| Comparative Example 201 | A | A | B | A | A | 50 | 5 | 6 | 190 | 285 |
| Comparative Example 202 | A | A | B | A | A | 50 | 5 | 5 | 190 | 285 |
| Comparative Example 203 | A | A | B | A | A | 50 | 5 | 6 | 190 | 285 |
| Comparative Example 204 | A | A | B | A | A | 50 | 5 | 6 | 190 | 285 |
| Comparative Example 205 | A | A | B | A | B | 270 | 20 | 3 | 180 | 285 |

| | Heat treatment process | Temperature of the heating zone [° C.] | Contraction ratio [%] | Elongation of the film [%] | Haze [%] | Re (mean value) [nm] | Rth (mean value) [nm] | \|Rth\|/Re (mean value) | Angle of the slow axis to the transport direction [°] |
|---|---|---|---|---|---|---|---|---|---|
| Example 201 | A | 240 | 37 | 60 | 0.2 | 163 | −94 | 0.58 | 90 |
| Example 202 | A | 200 | 15 | 19 | 0.2 | 23 | −12 | 0.52 | 90 |
| Example 203 | A | 240 | 34 | 57 | 0.2 | 161 | −87 | 0.54 | 90 |
| Example 204 | A | 260 | 42 | 40 | 0.3 | 230 | −111 | 0.48 | 90 |

TABLE 7-continued

| | | | | | | | | | |
|---|---|---|---|---|---|---|---|---|---|
| Example 205 | A | 240 | 31 | 52 | 0.2 | 218 | −108 | 0.50 | 90 |
| Example 206 | A | 240 | 35 | 23 | 0.2 | 161 | −85 | 0.53 | 90 |
| Example 207 | A | 240 | 31 | 23 | 0.2 | 162 | −89 | 0.55 | 90 |
| Example 208 | A | 240 | 30 | 22 | 0.2 | 171 | −61 | 0.36 | 90 |
| Example 209 | A | 240 | 33 | 23 | 0.2 | 183 | −27 | 0.15 | 90 |
| Example 210 | A | 240 | 30 | 24 | 0.2 | 159 | −84 | 0.53 | 90 |
| Example 211 | A | 240 | 37 | 60 | 0.3 | 236 | −119 | 0.50 | 90 |
| Example 212 | A | 240 | 43 | 42 | 0.2 | 204 | −99 | 0.49 | 90 |
| Comparative Example 201 | A | 160 | 5 | 15 | 0.4 | 21 | 45 | 2.14 | 0 |
| Comparative Example 202 | A | 180 | 35 | 52 | 0.3 | 3 | 3 | 1.00 | 90 |
| Comparative Example 203 | A | 300 | — | — | — | — | — | — | — |
| Comparative Example 204 | Process was not done | — | — | — | 0.3 | 1 | 49 | 49.0 | 90 |
| Comparative Example 205 | Process was not done | — | — | — | 0.2 | 5 | 42 | 8.40 | 90 |

As shown in Table 7, the transparent polymer film which had large retardation and relatively small |Rth|/Re value could be produced by subjecting the cellulose acylate to the heat treatment at temperature T, which satisfies the formula $Tc \leqq T < Tm_0$. Especially, the transparent polymer film which Re of the film was increased and which satisfies |Rth|/Re<0.5 was easily obtained. And in the film-forming process the stretching under the condition that the residual solvent was 5% by mass or more, Re and Rth were further slightly controlled. In Comparative Example 203, the film was melt when it was conveying and was broken.

Examples 221 to 229

Comparative Examples 221 to 225

(Preparation of Polymer Solution)

The polymer solution was prepared as the same method in Examples 201 to 212. Except that a mixed solvent in which dichloromethane/methanol/butanol (83/15/2 parts by mass) are mixed was used as a solvent.

(Production of Film)

In respective Examples and Comparative Examples, any one of film-forming processes A to C described later was selected and used according to Table 8.

FILM-Forming Process A:

The polymer was heated at 30° C., passed through a caster, Giesser, and cast onto a mirror-faced stainless support having a drum shape one of 3 m diameter and the surface temperature of the support was set at −5° C. The casting width was 200 cm. The space temperature in the entire casting zone was set at 15° C. At 50 cm before the end point of the casting zone, the cellulose acylate film thus cast and rolled was peeled off from the drum and then the both ends of the drum was clipped with pintenters. The amount of a residual solvent of the cellulose acylate web, the speed for the support of peeling off (peeling off roll draw), and the surface temperature of the film of the cellulose acylate web at the instant of peeling off were described in Table 8. The cellulose acylate web held with pintenters was transported to the drying zone and exposed to drying air applied thereto at 45° C., initially. Next, this was dried at 110° C. for 5 minutes and then at 140° C. for 10 minutes to obtain a transparent film of cellulose acylate having a thickness of 80 μm.

Film-Forming Process B:

The above solution of cellulose acylate was heated to 30° C., passed through a caster, Giesser (described in JP-A-11-314233), and cast onto a mirror-faced stainless support having a band length of 60 m and the surface temperature of the mirror-faced stainless support was set at 15° C., and the coating width was 200 cm. The space temperature in the entire casting zone was set at 15° C. At 50 cm before the end point of the casting zone, the cellulose acylate dope thus cast and rolled was peeled off from the band, and then the both ends of the dope was clipped with pin tenters. The amount of a residual solvent of the cellulose acylate web, the speed for the support of peeling off (peeling off roll draw), and the surface temperature of the film of the cellulose acylate web at the instant of peeling off were described in Table 8. The cellulose acylate web held with pin tenters was exposed to drying air applied thereto at 45° C. Next, this was dried at 110° C. for 5 minutes and then at 140° C. for 10 minutes to obtain a transparent film of cellulose acylate having a thickness of 80 μm.

Film-Forming Process C:

A film-forming process was performed according to the film-forming process A, except for the surface temperature of the support was set at 0° C. and the space temperature in the entire casting zone was set at 45° C.

(Heat Treatment)

The heat treatment method was performed as the same method in Examples 201 to 212.

(Evaluation of Produced Cellulose Acylate Film)

The respective cellulose acylate films thus obtained in respective examples and the comparative examples were evaluated. The results are shown in Table 8 below. The fluctuation (fluctuation of 5 points measured data) of respective Re and Rth samples obtained in the same manner as the above-mentioned retardation measurement evaluated based on the above-mentioned method was at most ±1 nm and at most ±2 nm, respectively, for all the samples. The fluctuation range in the direction of the slow axis was below 1°. The moisture permeability in terms of the film having a thickness of 80 μm was from 400 to 1200 g/(m²·day) in Examples 221 to 229 and Comparative Example 221 to 225, and those of the films before the heat treatment were also from 250 to 1000 g/(m²·day) for all samples.

TABLE 8

| | Cellulose acylate | Additives | Dissolution process | Type of film | volatile components [%] | Elongation [%] | (Support temperature) – (web temperature) [° C.] | Tc [° C.] | $Tm_0$ [° C.] |
|---|---|---|---|---|---|---|---|---|---|
| Example 221 | A | A | A | A | 270 | 20 | 3 | 188 | 285 |
| Example 222 | A | A | A | A | 270 | 20 | 3 | 188 | 285 |
| Example 223 | A | A | A | A | 270 | 20 | 3 | 188 | 285 |
| Example 224 | A | B | A | A | 270 | 20 | 2 | 188 | 290 |
| Example 225 | A | A | A | A | 100 | 20 | 3 | 188 | 285 |
| Example 226 | A | A | A | A | 370 | 20 | 4 | 188 | 285 |
| Example 227 | A | A | A | A | 270 | 50 | 3 | 188 | 285 |
| Example 228 | A | A | A | A | 270 | 100 | 3 | 188 | 285 |
| Example 229 | B | A | B | A | 270 | 20 | 3 | 159 | 285 |
| Comparative Example 221 | A | A | A | A | 270 | 20 | 3 | 188 | 285 |
| Comparative Example 222 | A | A | A | A | 270 | 20 | 3 | 188 | 285 |
| Comparative Example 223 | A | A | A | A | 270 | 20 | 3 | 188 | 285 |
| Comparative Example 224 | A | A | A | A | 270 | 20 | 3 | 188 | 285 |
| Comparative Example 225 | A | A | A | B | 50 | 5 | 6 | 188 | 285 |

| | Heat treatment process | Temperature of the heating zone [° C.] | Contraction ratio [%] | Elongation of the film [%] | Haze [%] | Re (mean value) [nm] | Rth (mean value) [nm] | \|Rth\|/Re (mean value) | Angle of the slow axis to the transport direction [°] |
|---|---|---|---|---|---|---|---|---|---|
| Example 221 | A | 200 | 32 | 25 | 0.2 | 28 | 26 | 0.93 | 90 |
| Example 222 | A | 240 | 35 | 24 | 0.2 | 186 | 3 | 0.02 | 90 |
| Example 223 | A | 260 | 44 | 40 | 0.2 | 224 | 1 | 0.00 | 90 |
| Example 224 | A | 240 | 41 | 51 | 0.2 | 193 | 1 | 0.01 | 90 |
| Example 225 | A | 240 | 33 | 25 | 0.2 | 191 | 9 | 0.05 | 90 |
| Example 226 | A | 240 | 30 | 24 | 0.2 | 178 | 2 | 0.01 | 90 |
| Example 227 | A | 240 | 35 | 28 | 0.2 | 203 | 10 | 0.05 | 90 |
| Example 228 | A | 240 | 37 | 33 | 0.2 | 224 | 15 | 0.07 | 90 |
| Example 229 | A | 240 | 43 | 42 | 0.2 | 248 | 9 | 0.04 | 90 |
| Comparative Example 221 | A | 160 | 7 | 10 | 0.4 | 22 | 37 | 1.68 | 0 |
| Comparative Example 222 | A | 180 | 29 | 20 | 0.3 | 12 | 34 | 2.83 | 0 |
| Comparative Example 223 | A | 300 | — | — | — | — | — | — | — |
| Comparative Example 224 | Process was not done | — | — | — | 0.2 | 5 | 42 | 8.40 | 90 |
| Comparative Example 225 | Process was not done | — | — | — | 0.3 | 1 | 49 | 49.0 | 90 |

As shown in Table 8, the transparent polymer film which had large retardation and relatively small |Rth|/Re value could be produced by subjecting the cellulose acylate to the heat treatment at temperature T, which satisfies the formula $Tc \leq T < Tm_0$. Especially, the transparent polymer film which Re of the film was increased and which satisfies |Rth|/Re<0.5 was easily obtained. And in the film-forming process of the transparent polymer film, the stretching under the condition that the residual solvent was 5% by mass or more, Re and Rth were further slightly controlled. In Comparative Example 223, the film was melt when it was conveying and was broken.

Examples 251 to 255

Re-Stretching of Film

Stretching is carried out by grasping the both ends of the cellulose acylate film in Example 110 with tenter clips for stretching the film in the direction perpendicular to the transport direction in a heating zone (Example 251). The temperature in the heating zone was 160° C. and the stretching ratio was 20%. The stretching ratio of the film was obtained according to the following formula in such a manner that marked lines were given to the film at a constant interval in the direction parallel to the transport direction of the film and the interval was measured before and after the stretching.

Stretching ratio(%)=100×{(interval of marked lines after stretching)−(interval of marked lines before stretching)}/interval of marked lines before stretching The values of Re and Rth of the obtained film was measured, thereby obtaining Re=123 nm and Rth=−2 nm. The slow axis of Re of the film was observed in the width direction of the film.

When the cellulose acylate film obtained in Example 130 was stretched in the same manner and the stretching ratio was 25%, thereby obtaining Re=170 nm and Rth=−1 nm (Example 252). The slow axis of Re of the film was observed in the width direction of the film.

When the cellulose acylate film obtained in Example 142 was stretched in the same manner and the stretching ratio was 33%, thereby obtaining haze=0.3%, Re=210 nm and Rth=−15 nm (Example 253). The slow axis of Re of the film was observed in the width direction of the film.

When the cellulose acylate film obtained in Example 208 was stretched in the same manner and the stretching ratio was 30%, thereby obtaining haze=0.2%, Re=148 nm and Rth=0 nm (Example 254). The slow axis of Re of the film was observed in the width direction of the film.

When the cellulose acylate film obtained in Example 228 was stretched in the same manner and the stretching ratio was 30%, thereby obtaining haze=0.2%, Re=216 nm and Rth=42 nm (Example 255). The slow axis of Re of the film was observed in the width direction of the film.

Comparative Examples 251 and 252

Manufacture of Birefringent Film

The cellulose acylate film before being subjected to the heat treatment in Example 101 was subjected to a method according to Example 5 described in JP-A-5-157911, thereby obtaining a birefringent film (Comparative Example 251). The film had a fluctuation range of as large as 8° in the slow axis direction, and the fluctuation (fluctuation of 5 points measured data) of Re and Rth was large as ±13 nm for Re and +21 nm for Rth.

The cellulose acylate film before being subjected to the heat treatment in Example 139 was also subjected to the same method, thereby obtaining a birefringent film (Comparative Example 252). The film had a fluctuation range of as large as 8 in the slow axis direction, and the fluctuation (fluctuation of 5 points measured data) of Re and Rth was large as ±25 nm for Re and ±43 nm for Rth.

Example 271 to 277

Manufacture of Laminated Retardation Film

The cellulose acylate film of the invention can be used directly as the retardation film, but here, a retardation film having a controlled Rth/Re ratio was manufactured by sticking the film by the use of an adhesive in roll-to-roll operation (Example 271).

FUJITAC TD80UF (manufactured by Fujifilm corporation) and the film in Example 103 were stuck to each other by the use of an adhesive in roll-to-roll operation, and then Re and Rth were measured by the aforementioned method to give Re=117 nm and Rth=0 nm. The slow axis of Re of the retardation film was observed in the width direction of the film.

FUJITAC TD80UF (manufactured by Fujifilm corporation) and two of the films in Example 127 were stuck to each other by the use of an adhesive in roll-to-roll operation, and then Re and Rth were measured by the same method to give Re=240 nm and Rth=0 nm (Example 272). The slow axis of Re of the retardation film was observed in the width direction of the film.

Two of FUJITAC T80UZ (manufactured by Fujifilm corporation) and the film in Example 142 were stuck to each other by the use of an adhesive in roll-to-roll operation, and then Re and Rth were measured by the same method to give Re=218 nm and Rth=−18 nm (Example 273). The slow axis of Re of the retardation film was observed in the width direction of the film.

Two of the films in Example 166 were stuck to each other by the use of an adhesive in roll-to-roll operation, and then Re and Rth were measured by the same method to give Re=252 nm and Rth=65 nm (Example 274). The slow axis of Re of the retardation film was observed in the width direction of the film.

FUJITAC T80UZ (manufactured by Fujifilm corporation) and the film in Example 188 were stuck to each other by the use of an adhesive in roll-to-roll operation, and then Re and Rth were measured by the same method to give Re=150 nm and Rth=0 nm (Example 275). The slow axis of Re of the retardation film was observed in the width direction of the film.

FUJITAC TD80UL (manufactured by Fujifilm corporation) and the films in Example 209 were stuck to each other by the use of an adhesive in roll-to-roll operation, and then Re and Rth were measured by the same method to give Re=166 nm and Rth=−19 nm (Example 276). The slow axis of Re of the retardation film was observed in the width direction of the film.

FUJITAC TD80UL (manufactured by Fujifilm corporation) and the films in Example 255 were stuck to each other by the use of an adhesive in roll-to-roll operation, and then Re and Rth were measured by the same method to give Re=213 nm and Rth=86 nm (Example 277). The slow axis of Re of the retardation film was observed in the width direction of the film.

Examples 301 to 431

Comparative Examples 301 to 307

Manufacture and Evaluation of Polarizer

1) Saponification of Film

A film A and film B shown in Table 9 below were dipped in a 1.5 mol/L of NaOH aqueous solution (saponification solution) that was temperature-controlled at 55° C. for 2 minutes and then washed with water. After that, the films were dipped in a 0.05 mol/L sulfuric acid aqueous solution for 30 seconds and further passed through a water washing bath. Then, the films were subjected to air knife treatment three times to remove water and retained in a drying zone at 70° C. for 15 seconds to be dried, thereby manufacturing saponified films.

2) Manufacture of Polarizing Film

According to Example 1 described in JP-A-2001-141926, the film was stretched in a longitudinal direction by giving difference in circumferential velocities to two pairs of nip rolls, thereby preparing a polarizing film having a thickness of 20 μm.

3) Sticking

The polarizing film thus obtained and the two films (film A and film B respectively, whose combination in respective Examples and Comparative Examples is shown in Table 9 below) selected from the saponified films were disposed so that the saponified surfaces of the film faced to the polarizing film and sandwiched the polarizing film, and then stuck to each other by the use of a 3% PVA (PVA-117H, manufactured by KURARAY Co., Ltd.) aqueous solution as an adhesive in such a manner that the polarizing axis crossed perpendicularly to the longitudinal direction of the film.

In Table 9, 'TAC A' indicates FUJITAC TD80UF (manufactured by Fujifilm corporation; moisture permeability 430 g/($m^2$·day) at 40° C. and a relative humidity of 90%) (80 μm in terms of thickness), 'polycarbonate' indicates Panlite C1400 (manufactured by TEIJIN CHEMICALS, Ltd.; moisture permeability 30 g/($m^2$·day) at 40° C. and a relative humidity of 90%) (80 μm in terms of thickness), 'COP1' indicates ARTON FILM (thickness: 80 μm, manufactured by JSR corporation; moisture permeability 30 g/(m$^2$·day) at 40° C. and a relative humidity of 90%) (80 μm in terms of thickness), and 'COP2' indicates ZEONOR FILM (thickness: 100 μm, manufactured by ZEON; moisture permeability 0 g/(m$^2$·day) at 40° C. and a relative humidity of 90%) (80 μm in terms of thickness).

In Comparative Example 304, the sticking was carried out by using a film which had been subjected to surface treatment replaced by corona treatment.

4) Evaluation of Polarizer (Initial Polarization Degree)

The polarization degree of the polarizer was calculated according to the method described above. The result is shown in Table 9.

(After Storage Polarization Degree 1)

The film A side of the polarizer was stuck to a glass plate with an adhesive, and was left under conditions of 60° C. and a relative humidity of 95% for 500 hours and the polarization degree after the lapse of time (after storage polarization degree) was calculated according to the aforementioned method. The results are shown in Table 9 below.

(After Storage Polarization Degree 2)

The film A side of the polarizer was stuck to a glass plate with an adhesive, and was left under conditions of 90° C. and a relative humidity of 0% for 500 hours and the polarization degree after the lapse of time (after storage polarization degree) was calculated according to the aforementioned method. The results are shown in Table 9 below.

TABLE 9

| | Film A | Film B | Initial polarization degree [%] | Polarization degree after storage 1 [%] | Polarization degree after storage 2 [%] |
|---|---|---|---|---|---|
| Example 301 | Example 101 | TAC A | 99.9 | 99.9 | 99.9 |
| Example 302 | Example 102 | TAC A | 99.9 | 99.9 | 99.9 |
| Example 303 | Example 103 | TAC A | 99.9 | 99.9 | 99.9 |
| Example 304 | Example 104 | TAC A | 99.9 | 99.9 | 99.9 |
| Example 305 | Example 105 | TAC A | 99.9 | 99.9 | 99.9 |
| Example 306 | Example 106 | TAC A | 99.9 | 99.9 | 99.9 |
| Example 307 | Example 107 | TAC A | 99.9 | 99.9 | 99.9 |
| Example 308 | Example 108 | TAC A | 99.9 | 99.9 | 99.9 |
| Example 309 | Example 109 | TAC A | 99.9 | 99.9 | 99.9 |
| Example 310 | Example 110 | TAC A | 99.9 | 99.9 | 99.9 |
| Example 311 | Example 111 | TAC A | 99.9 | 99.9 | 99.9 |
| Example 312 | Example 112 | TAC A | 99.9 | 99.9 | 99.9 |
| Example 313 | Example 251 | TAC A | 99.9 | 99.9 | 99.9 |
| Example 314 | Example 110 | Example 110 | 99.9 | 99.9 | 99.9 |
| Example 321 | Example 120 | TAC A | 99.9 | 99.9 | 99.9 |
| Example 322 | Example 121 | TAC A | 99.9 | 99.9 | 99.9 |
| Example 323 | Example 125 | TAC A | 99.9 | 99.9 | 99.9 |
| Example 324 | Example 126 | TAC A | 99.9 | 99.9 | 99.9 |
| Example 325 | Example 127 | TAC A | 99.9 | 99.9 | 99.9 |
| Example 326 | Example 129 | TAC A | 99.9 | 99.9 | 99.9 |
| Example 327 | Example 130 | TAC A | 99.9 | 99.9 | 99.9 |
| Example 328 | Example 131 | TAC A | 99.9 | 99.9 | 99.9 |
| Example 329 | Example 132 | TAC A | 99.9 | 99.9 | 99.9 |
| Example 330 | Example 133 | TAC A | 99.9 | 99.9 | 99.9 |
| Example 331 | Example 134 | TAC A | 99.9 | 99.9 | 99.9 |
| Example 332 | Example 135 | TAC A | 99.9 | 99.9 | 99.9 |
| Example 333 | Example 137 | TAC A | 99.9 | 99.9 | 99.9 |
| Example 334 | Example 138 | TAC A | 99.9 | 99.9 | 99.9 |
| Example 335 | Example 139 | TAC A | 99.9 | 99.9 | 99.9 |
| Example 336 | Example 139 | TAC A | 99.9 | 99.9 | 99.9 |
| Example 337 | Example 140 | Example 134 | 99.9 | 99.9 | 99.9 |
| Example 338 | Example 128 | TAC A | 99.9 | 99.9 | 99.9 |
| Example 341 | Example 141 | TAC A | 99.9 | 99.9 | 99.9 |
| Example 342 | Example 142 | TAC A | 99.9 | 99.9 | 99.9 |
| Example 343 | Example 143 | TAC A | 99.9 | 99.9 | 99.9 |
| Example 344 | Example 144 | TAC A | 99.9 | 99.9 | 99.9 |
| Example 345 | Example 145 | TAC A | 99.9 | 99.9 | 99.9 |
| Example 346 | Example 146 | TAC A | 99.9 | 99.9 | 99.9 |
| Example 347 | Example 147 | TAC A | 99.9 | 99.9 | 99.9 |
| Example 348 | Example 148 | TAC A | 99.9 | 99.9 | 99.9 |
| Example 349 | Example 149 | TAC A | 99.9 | 99.9 | 99.9 |
| Example 350 | Example 253 | TAC A | 99.9 | 99.9 | 99.9 |
| Example 351 | Example 253 | Example 253 | 99.9 | 99.9 | 99.9 |
| Comparative Example 352 | Example 150 | TAC A | 99.9 | 99.9 | 99.9 |
| Comparative Example 353 | Example 151 | TAC A | 99.9 | 99.9 | 99.9 |
| Comparative Example 354 | Example 152 | TAC A | 99.9 | 99.9 | 99.9 |
| Example 361 | Example 161 | TAC A | 99.9 | 99.9 | 99.9 |
| Example 362 | Example 162 | TAC A | 99.9 | 99.9 | 99.9 |
| Example 363 | Example 163 | TAC A | 99.9 | 99.9 | 99.9 |
| Example 364 | Example 164 | TAC A | 99.9 | 99.9 | 99.9 |
| Example 365 | Example 165 | TAC A | 99.9 | 99.9 | 99.9 |
| Example 366 | Example 166 | TAC A | 99.9 | 99.9 | 99.9 |

TABLE 9-continued

| | Film A | Film B | Initial polarization degree [%] | Polarization degree after storage 1 [%] | Polarization degree after storage 2 [%] |
|---|---|---|---|---|---|
| Example 367 | Example 170 | TAC A | 99.9 | 99.9 | 99.9 |
| Example 368 | Example 171 | TAC A | 99.9 | 99.9 | 99.9 |
| Example 369 | Example 171 | Example 168 | 99.9 | 99.9 | 99.9 |
| Example 381 | Example 181 | TAC A | 99.9 | 99.9 | 99.9 |
| Example 382 | Example 182 | TAC A | 99.9 | 99.9 | 99.9 |
| Example 383 | Example 183 | TAC A | 99.9 | 99.9 | 99.9 |
| Example 384 | Example 184 | TAC A | 99.9 | 99.9 | 99.9 |
| Example 385 | Example 185 | TAC A | 99.9 | 99.9 | 99.9 |
| Example 386 | Example 188 | TAC A | 99.9 | 99.9 | 99.9 |
| Example 387 | Example 189 | TAC A | 99.9 | 99.9 | 99.9 |
| Example 388 | Example 190 | TAC A | 99.9 | 99.9 | 99.9 |
| Example 389 | Example 193 | TAC A | 99.9 | 99.9 | 99.9 |
| Example 390 | Example 193 | Example 193 | 99.9 | 99.9 | 99.9 |
| Example 401 | Example 201 | TAC A | 99.9 | 99.9 | 99.9 |
| Example 402 | Example 202 | TAC A | 99.9 | 99.9 | 99.9 |
| Example 403 | Example 203 | TAC A | 99.9 | 99.9 | 99.9 |
| Example 404 | Example 204 | TAC A | 99.9 | 99.9 | 99.9 |
| Example 405 | Example 205 | TAC A | 99.9 | 99.9 | 99.9 |
| Example 406 | Example 206 | TAC A | 99.9 | 99.9 | 99.9 |
| Example 407 | Example 207 | TAC A | 99.9 | 99.9 | 99.9 |
| Example 408 | Example 208 | TAC A | 99.9 | 99.9 | 99.9 |
| Example 409 | Example 209 | TAC A | 99.9 | 99.9 | 99.9 |
| Example 410 | Example 210 | TAC A | 99.9 | 99.9 | 99.9 |
| Example 411 | Example 211 | TAC A | 99.9 | 99.9 | 99.9 |
| Example 412 | Example 212 | TAC A | 99.9 | 99.9 | 99.9 |
| Example 413 | Example 254 | TAC A | 99.9 | 99.9 | 99.9 |
| Example 414 | Example 254 | Example 254 | 99.9 | 99.9 | 99.9 |
| Example 421 | Example 221 | TAC A | 99.9 | 99.9 | 99.9 |
| Example 422 | Example 222 | TAC A | 99.9 | 99.9 | 99.9 |
| Example 423 | Example 223 | TAC A | 99.9 | 99.9 | 99.9 |
| Example 424 | Example 224 | TAC A | 99.9 | 99.9 | 99.9 |
| Example 425 | Example 225 | TAC A | 99.9 | 99.9 | 99.9 |
| Example 426 | Example 226 | TAC A | 99.9 | 99.9 | 99.9 |
| Example 427 | Example 227 | TAC A | 99.9 | 99.9 | 99.9 |
| Example 428 | Example 228 | TAC A | 99.9 | 99.9 | 99.9 |
| Example 429 | Example 229 | TAC A | 99.9 | 99.9 | 99.9 |
| Example 430 | Example 255 | TAC A | 99.9 | 99.9 | 99.9 |
| Example 431 | Example 255 | Example 255 | 99.9 | 99.9 | 99.9 |
| Comparative Example 301 | Polycarbonate | Polycarbonate | (Unmeasurable due to insufficient adhesion) | | |
| Comparative Example 302 | COP1 | COP1 | (Unmeasurable due to insufficient adhesion) | | |
| Comparative Example 303 | COP2 | COP2 | (Unmeasurable due to insufficient adhesion) | | |
| Comparative Example 304 | COP2 | COP2 | 99.9 | 99.9 | (Air bubble occurred) |
| Comparative Example 305 | Comparative Example 101 | TAC A | 99.9 | 99.9 | 99.9 |
| Comparative Example 306 | Comparative Example 102 | TAC A | 99.9 | 99.9 | 99.9 |
| Comparative Example 307 | TAC A | TAC A | 99.9 | 99.9 | 99.9 |

5) Implementation Evaluation for IPS Type Liquid Crystal Display Device

When each of the polarizers in Examples 303 and 312 was set in an IPS type liquid crystal display device (32 V type high vision liquid crystal television monitor (W32-L7000), manufactured by HITACHI, Ltd.) in place of a polarizer having been set in the monitor, viewing angle properties were improved. This effect was also confirmed when the liquid crystal display device was left under conditions of low humidity (at 25° C. and a relative humidity of 10%) for 500 hours and under conditions of high humidity (at 25° C. and a relative humidity of 80%) for 500 hours. On the contrary, when each of the polarizers in Comparative Examples 305 to 307 was set, the viewing angle properties were either not improved or insufficiently improved.

When each of the polarizers in Examples 327, 335, 346, 349, 350, 364, 366, 381, 385, 387, 409, and 413 was set in an IPS type liquid crystal display device (32 V type high vision liquid crystal television monitor (W32-L7000), manufactured by HITACHI, Ltd.) in place of a polarizer having been set in the monitor in the same manner, viewing angle properties were improved. When each of the polarizers in Examples 327 and 335 was set, the viewing angle properties were both improved more than when the polarizers in Examples 337 was set. When each of the polarizers in Examples 346, 349 and 350 was set, the viewing angle properties were both improved more than when the polarizers in Examples 341 was set. When each of the polarizers in Examples 409 and 413 was set, the viewing angle properties were both improved more than when the polarizers in Examples 406 was set.

Two sets of Polarizer of Example 430 were arranged and then the liquid crystal display device was manufactured. In the liquid crystal display device, Example 310, IPS type liquid crystal cell, and Example 430 were piled in this order, such that the film A could be configured as the liquid crystal cell side. At this time, the transmission axes of the upper and lower polarizers were allowed to be perpendicular to each other and the transmission axis of the upper polarizer was allowed to be parallel to the molecular longitudinal axis direction of the liquid crystal cell (that is, the slow axis of the optical compensation layer is perpendicular to the molecular longitudinal axis direction of the liquid crystal cell). The known things were used as the IPS type liquid cell or IPS type electrode board. The alignment of the liquid crystal cell is a horizontal alignment and the liquid crystal has positive permittivity anisotropy. The liquid crystal improved for IPS liquid crystal and placed on the market was used. The matter property of the liquid crystal cell was as follows: Δn of liquid crystal: 0.099, cell gap of liquid crystal layer: 3.0 μm, pretilt angle: 5°, and rubbing directions of upper and lower boards: 75°. The liquid crystal display device manufactured in this manner had the excellent viewing angle property.

Industrial Applicability of the Invention

According to the invention, it is possible to provide a transparent polymer film of which expressibility of retardation is controlled by relatively easy operations. Especially a transparent polymer film satisfying |Rth|/Re<0.5 that was not able to be manufactured without a complex process before could be easily manufactured. The transparent polymer film manufactured was widely applied as optical usage, for example a retardation film. Since the transparent polymer film of the invention has proper moisture permeability, the film can be adhered to the polarizing film on line. Accordingly, the polarizer having excellent visibility and high productivity can be provided. In addition, the liquid crystal display device having high-reliability can be provided. Consequently, the invention has high industrial applicability.

The invention claimed is:

1. A method for producing a transparent polymer film, which comprises heat-treating a polymer film selected from the group consisting of cellulose ester films, polycarbonate films, cyclo-olefin polymer films, poly alylate films, poly sulfone films, vinyl polymer films, polyamide films, polyimide films, cyclo-olefin copolymer films and poly norbornene films at a temperature T (unit, ° C.) satisfying a condition of the following formula (1):

$Tc \leq T < Tm_0$     Formula (1)

wherein Tc represents the crystallization temperature (unit, ° C.) of the polymer film before the heat treatment; and $Tm_0$ represents the melting point (unit, ° C.) of the polymer film before the heat treatment, wherein the method is for producing a transparent polymer film satisfying the following formula (2):

$|Rth|/Re < 0.5$     Formula (2)

wherein Re represents the retardation (unit, nm) in the in-plane direction; and Rth means the retardation (unit, nm) in the film-thickness direction.

2. The method for producing a transparent polymer film according to claim 1, wherein the film is stretched simultaneously with the heat treatment.

3. The method for producing a transparent polymer film according to claim 1, wherein the film is subjected to the heat treatment while transported.

4. The method for producing a transparent polymer film according to claim 1, wherein the film is subjected to the heat treatment while transported, and is stretched in the transport direction.

5. The method for producing a transparent polymer film according to claim 1, wherein the film is stretched at a temperature lower than Tc after the heat treatment.

6. The method for producing a transparent polymer film according to claim 5, wherein the film is subjected to the heat treatment while transported, and after the heat treatment, it is stretched at a temperature lower than Tc in the direction perpendicular to the transport direction during the heat treatment.

7. The method for producing a transparent polymer film according to claim 1, wherein the polymer film before heat treatment is stretched before the heat treatment.

8. The method for producing a transparent polymer film according to claim 7, wherein the film is subjected to the heat treatment while stretched in the same direction as the stretching direction before the heat treatment.

9. The method for producing a transparent polymer film according to claim 1, wherein the polymer film is contracted by from 5 to 80% during the heat treatment.

10. The method for producing a transparent polymer film according to claim 9, wherein the polymer film before the heat treatment is formed while transported, and it is contracted during the heat treatment in the direction perpendicular to the transport direction.

11. The method for producing a transparent polymer film according to claim 1, wherein the film is cooled at from 100 to 1,000,000° C./min after the heat treatment.

12. The method for producing a transparent polymer film according to claim 1, wherein the polymer is cellulose acylate.

13. The method for producing a transparent polymer film according to claim 12, wherein the cellulose acylate satisfies the following formula (3):

$2.70 < SA + SB \leq 3.00$     Formula (3)

wherein SA represents a degree of substitution of the hydroxyl group of cellulose with an acetyl group; SB represents a degree of substitution of the hydroxyl group of cellulose with an acyl group having at least 3 carbon atoms.

14. The method for producing a transparent polymer film according to claim 12, wherein the cellulose acylate satisfies the following formula (4):

$0 < SB \leq 3.0$     Formula (4)

wherein SB represents a degree of substitution of the hydroxyl group of cellulose with an acyl group having at least 3 carbon atoms.

15. The method for producing a transparent polymer film according to claim 1, wherein the polymer film before the heat treatment is formed while transported, and it is stretched by from 0.1% to less than 15% in the transport direction under the condition that the residual solvent amount therein is from 5 to 1000%.

16. The method for producing a transparent polymer film according to claim 1, wherein the polymer film before the heat treatment is formed while transported, and it is stretched by from 15 to 300% in the transport direction under the condition that the residual solvent amount therein is from 5 to 1000%.

17. The method for producing a transparent polymer film according to claim 1, wherein the polymer film before the heat treatment contains an additive composition that increases Rth of the polymer film before the heat treatment.

18. A method for producing a transparent polymer film satisfying the following formula (2), which comprises heat-treating a transparent polymer film selected from the group consisting of cellulose ester films, polycarbonate films, cyclo-olefin polymer films, poly alylate films, poly sulfone films, vinyl polymer films, polyamide films, polyimide films, cyclo-olefin copolymer films and poly norbornene films at a temperature T (unit, ° C.) satisfying a condition of the following formula (1):

$$Tc \leq T < Tm_0 \qquad \text{Formula (1)}$$

wherein Tc represents the crystallization temperature (unit, ° C.) of the polymer film before the heat treatment; and $Tm_0$ represents the melting point (unit, ° C.) of the polymer film before the heat treatment, $$|Rth|/Re < 0.5 \qquad \text{Formula (2)}$$

wherein Re represents the retardation (unit, nm) in the in-plane direction; and Rth means the retardation (unit, nm) in the film-thickness direction.

19. The method for producing a transparent polymer film according to claim 1, wherein the film is cooled at 10,000°C./min or the heat treatment.

* * * * *